US010026974B2

(12) United States Patent
Tatsui et al.

(10) Patent No.: US 10,026,974 B2
(45) Date of Patent: Jul. 17, 2018

(54) POWER GENERATION SYSTEM AND METHOD OF OPERATING THE SAME

(75) Inventors: Hiroshi Tatsui, Shiga (JP); Junji Morita, Kyoto (JP); Shigeki Yasuda, Osaka (JP); Akinori Yukimasa, Osaka (JP); Atsutaka Inoue, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 926 days.

(21) Appl. No.: 14/002,979

(22) PCT Filed: Feb. 15, 2012

(86) PCT No.: PCT/JP2012/000998
§ 371 (c)(1),
(2), (4) Date: Sep. 3, 2013

(87) PCT Pub. No.: WO2012/132197
PCT Pub. Date: Oct. 4, 2012

(65) Prior Publication Data
US 2013/0344408 A1 Dec. 26, 2013

(30) Foreign Application Priority Data

Mar. 30, 2011 (JP) .................... 2011-074166
Aug. 3, 2011 (JP) .................... 2011-170407

(51) Int. Cl.
*H01M 8/04014* (2016.01)
*H01M 8/0612* (2016.01)
(Continued)

(52) U.S. Cl.
CPC ........ *H01M 8/04022* (2013.01); *F23N 1/022* (2013.01); *F23N 5/003* (2013.01);
(Continued)

(58) Field of Classification Search
CPC ......... H01M 8/04014; H01M 8/04022; H01M 8/04313–8/04955; H01M 8/04007
(Continued)

(56) References Cited

U.S. PATENT DOCUMENTS

| | | | |
|---|---|---|---|
| 2003/0031900 A1 | 2/2003 | Tajima et al. | |
| 2007/0224475 A1* | 9/2007 | Terada | H01M 8/04022 429/423 |
| 2008/0113234 A1* | 5/2008 | Saito | B01J 19/0093 48/61 |

FOREIGN PATENT DOCUMENTS

| | | |
|---|---|---|
| DE | 19852853 A1 | 7/1999 |
| DE | 10000405 A1 | 7/2000 |

(Continued)

OTHER PUBLICATIONS

International Search Report issued in PCT/JP2012/000998, dated May 29, 2012, with English translation.
(Continued)

*Primary Examiner* — Stefanie S Wittenberg
(74) *Attorney, Agent, or Firm* — McDermott Will & Emery LLP

(57) ABSTRACT

A power generation system according to the present invention includes: a fuel cell unit including a fuel cell, a hydrogen generator having a first combustor, and a case; a controller; a combustion unit including a second combustor; and a discharge passage formed to cause the case and the combustion unit to communicate with each other. In a case where the controller causes one of the first combustor and the second combustor to perform the ignition operation, the controller maintains an operating state of the other combustor during the period of the ignition operation of the one combustor.

15 Claims, 14 Drawing Sheets

(51) Int. Cl.
*F23N 1/02* (2006.01)
*F23N 5/00* (2006.01)
*H01M 8/04955* (2016.01)
*H01M 8/0662* (2016.01)
*H01M 8/04223* (2016.01)

(52) U.S. Cl.
CPC ..... *H01M 8/04955* (2013.01); *H01M 8/0618* (2013.01); *F23N 2027/02* (2013.01); *F23N 2033/08* (2013.01); *F23N 2037/02* (2013.01); *F23N 2041/06* (2013.01); *F24H 2240/10* (2013.01); *H01M 8/04223* (2013.01); *H01M 8/0662* (2013.01); *H01M 2250/10* (2013.01); *H01M 2250/405* (2013.01); *Y02B 90/14* (2013.01); *Y02B 90/16* (2013.01)

(58) Field of Classification Search
USPC .......................................... 429/428, 429, 441
See application file for complete search history.

(56) References Cited

FOREIGN PATENT DOCUMENTS

| | | |
|---|---|---|
| DE | 102006048984 A1 | 4/2008 |
| EP | 2677585 A1 | 12/2013 |
| JP | 07-220745 A | 8/1995 |
| JP | 11-097045 A | 4/1999 |
| JP | 2002-349844 A | 12/2002 |
| JP | 2003-130346 A | 5/2003 |
| JP | 2005-063697 A | 3/2005 |
| JP | 2005-346986 A | 12/2005 |
| JP | 2006-073446 A | 3/2006 |
| JP | 2007-248009 A | 9/2007 |
| JP | 2008-210631 A | 9/2008 |

OTHER PUBLICATIONS

Extended European Search Report issued in corresponding European Application No. 12763129.9, dated Feb. 18, 2014.

\* cited by examiner

POWER GENERATION SYSTEM AND METHOD OF OPERATING THE SAME

RELATED APPLICATIONS

This application is the U.S. National Phase under 35 U.S.C. § 371 of International Application No. PCT/JP2012/000998, filed on Feb. 15, 2012, which in turn claims the benefit of Japanese Application No. 2011-074166, filed on Mar. 30, 2011, which in turn claims the benefit of Japanese Application No. 2011-170407, filed on Aug. 3, 2011, the disclosures of which Applications are incorporated by reference herein.

TECHNICAL FIELD

The present invention relates to a power generation system configured to supply heat and electricity and a method of operating the power generation system, and particularly to the structure of the power generation system.

BACKGROUND ART

A cogeneration system supplies generated electric power to users for electric power loads and recovers and stores exhaust heat for hot water supply loads of the users, the exhaust heat being generated by the electric power generation. Known as this type of cogeneration system is a cogeneration system configured such that a fuel cell and a water heater operate by the same fuel (see PTL 1, for example). A cogeneration system disclosed in PTL 1 includes: a fuel cell; a heat exchanger configured to recover heat generated by the operation of the fuel cell; a hot water tank configured to store water having flowed through the heat exchanger to be heated; and a water heater configured to heat the water flowing out from the hot water tank up to a predetermined temperature, and is configured such that the fuel cell and the water heater operate by the same fuel.

Moreover, a fuel cell power generation apparatus provided inside a building is known, which is configured for the purpose of improving an exhaust performance of the fuel cell power generation apparatus (see PTL 2, for example). A power generation apparatus disclosed in PTL 2 is a fuel cell power generation apparatus provided and used in a building including an intake port and includes an air introducing port through which air in the building is introduced to the inside of the fuel cell power generation apparatus, an air discharging pipe through which the air in the fuel cell power generation apparatus is discharged to the outside of the building, and a ventilation unit. The ventilation unit introduces the air from the outside of the building through the intake port to the inside of the building, further introduces the air through the air introducing port to the inside of the fuel cell power generation apparatus, and discharges the air through the air discharging pipe to the outside of the building.

Further, a power generation apparatus including a duct extending in a vertical direction is known, which is configured for the purpose of improving the exhaust performance of an exhaust gas generated by a fuel cell provided inside a building (see PTL 3, for example). In a power generation apparatus disclosed in PTL 3, a duct extending inside a building in a vertical direction and having an upper end portion located outside the building is a double pipe, and a ventilating pipe and an exhaust pipe are coupled to the duct such that an exhaust gas or air flows through the inside or outside of the duct.

CITATION LIST

Patent Literature

PTL 1: Japanese Laid-Open Patent Application Publication No. 2007-248009
PTL 2: Japanese Laid-Open Patent Application Publication No. 2006-73446
PTL 3: Japanese Laid-Open Patent Application Publication No. 2008-210631

SUMMARY OF INVENTION

Technical Problem

Here, in the case of providing the cogeneration system disclosed in PTL 1 in a building, the below-described configuration may be adopted in reference to the power generation apparatus disclosed in PTL 2. To be specific, the configuration is that: a cogeneration unit including a fuel cell and a hot water supply unit including a water heater are separately provided; a ventilation fan is provided in the cogeneration unit; and an exhaust passage configured to cause the cogeneration unit and the water heater (hot water supply unit) to communicate with each other (configured to connect the cogeneration system and the water heater) is formed.

In the above configuration, for example, in a state where the fuel cell unit is operating, and the hot water supply unit is in a stop state, the hot water supply unit is activated (especially, a burner of the hot water supply unit is ignited). In this case, by changing, for example, the amount of electric power generated by the fuel cell, the pressure loss of the exhaust passage changes. Therefore, there is a possibility that the flow rates of the combustible gas and air supplied to the burner of the hot water supply unit change, and an ignition operation of the burner of the hot water supply unit is not normally performed.

As above, in the case of activating one of the fuel cell unit and the hot water supply unit in a state where the other unit is operating, there is a problem that the ignition operation of the burner of the one unit cannot be stably performed by the change in the pressure loss of the discharge passage.

Moreover, for example, in the case of activating both the fuel cell unit and the hot water supply unit in a state where both the fuel cell unit and the hot water supply unit are in a stop state, and if the timing of the ignition operation of the burner of the hot water supply unit and the timing of the ignition operation of a burner of a hydrogen generator constituting the fuel cell unit differ from each other, the flow rate of the exhaust gas discharged to the exhaust passage changes. Therefore, regarding the burner of the unit in which the ignition operation has started at a later timing, there is a possibility that the flow rates of the combustible gas and air supplied to the burner change, and the ignition operation of the burner is not normally performed.

As above, in the case of activating both the fuel cell unit and the hot water supply unit in a state where both the fuel cell unit and the hot water supply unit are in a stop state, and if the timings for activating respective burners differ from each other, there is a problem that the pressure loss of the discharge passage changes, and the burner in which the ignition operation is started at a later timing cannot stably perform the ignition operation.

An object of the present invention is to provide a power generation system capable of, in a case where an exhaust passage configured to cause a fuel cell unit and a combustion unit to communicate with each other is formed, stably performing an ignition operation of one of combustors even if a command for changing an operating state of a unit including the other combustor is output, and a method of operating the power generation system.

Solution to Problem

To solve the above conventional problems, a power generation system according to the present invention includes: a fuel cell unit including a fuel cell configured to generate electric power using a fuel gas and an oxidizing gas, a hydrogen generator including a first combustor and configured to generate the fuel gas supplied to the fuel cell, and a case configured to house at least the fuel cell and the hydrogen generator; a controller; a combustion unit arranged outside the case and including a second combustor configured to combust a combustible gas; and a discharge passage which is formed to cause the fuel cell unit and the combustion unit to communicate with each other and through which an exhaust gas discharged from the fuel cell unit and an exhaust gas discharged from the combustion unit are discharged to an atmosphere, wherein in a case where the controller causes one of the first combustor and the second combustor to perform an ignition operation, the controller maintains an operating state of the other combustor during a period of the ignition operation of the one combustor.

Herein, in a case where the combustor is performing a combustion operation, the "operating state of the combustor" denotes a state where the combustor is performing the combustion operation. In a case where the combustor is in a stop state, the "operating state of the combustor" denotes the stop state.

Moreover, the "ignition operation" denotes a series of operations of the ignition of the combustion air and the combustion fuel by the supply of the combustion air, the operation of the ignition unit, such as an ignitor, and the supply of the combustion fuel, such as a combustible gas.

Further, "during the period of the ignition operation" denotes a period in which the series of operations including the supply of the combustion air, the operation of the ignition unit, such as the ignitor, and the ignition of the combustion air and the combustion fuel by the supply of the combustion fuel, such as the combustible gas, are being performed. In this case, for example, in a case where the series of operations including the supply of the combustion air, the operation of the ignition unit, such as the ignitor, and the ignition of the combustion air and the combustion fuel by the supply of the combustion fuel, such as the combustible gas, are repeatedly performed, "during the period of the ignition operation" denotes a period in which the series of operations are being repeatedly performed a preset number of times.

With this, in the power generation system including the exhaust passage configured to cause the fuel cell unit and the combustion unit to communicate with each other, the ignition operation of one of the combustors can be stably performed even if a command for changing the operating state of the unit including the other combustor is output.

Moreover, a method of operating a power generation system according to the present invention is a method of operating a power generation system, the power generation system including: a fuel cell unit including a fuel cell configured to generate electric power using a fuel gas and an oxidizing gas, a hydrogen generator including a first combustor and configured to generate the fuel gas supplied to the fuel cell, and a case configured to house at least the fuel cell and the hydrogen generator; a combustion unit arranged outside the case and including a second combustor configured to combust a combustible gas; and a discharge passage which is formed to cause the fuel cell unit and the combustion unit to communicate with each other and through which an exhaust gas discharged from the fuel cell unit and an exhaust gas discharged from the combustion unit are discharged to an atmosphere, the method including, when causing one of the first combustor and the second combustor to perform an ignition operation, maintaining an operating state of the other combustor during a period of the ignition operation of the one combustor.

With this, in the power generation system including the exhaust passage configured to cause the fuel cell unit and the combustion unit to communicate with each other, the ignition operation of one of the combustors can be stably performed even if the command for changing the operating state of the unit including the other combustor is output.

Advantageous Effects of Invention

According to the power generation system of the present invention and the method of operating the power generation system, in the power generation system including the exhaust passage configured to cause the fuel cell unit and the combustion unit to communicate with each other, the ignition operation of one of the combustors can be stably performed even if the command for changing the operating state of the unit including the other combustor is output.

DESCRIPTION OF EMBODIMENTS

Figure 1:
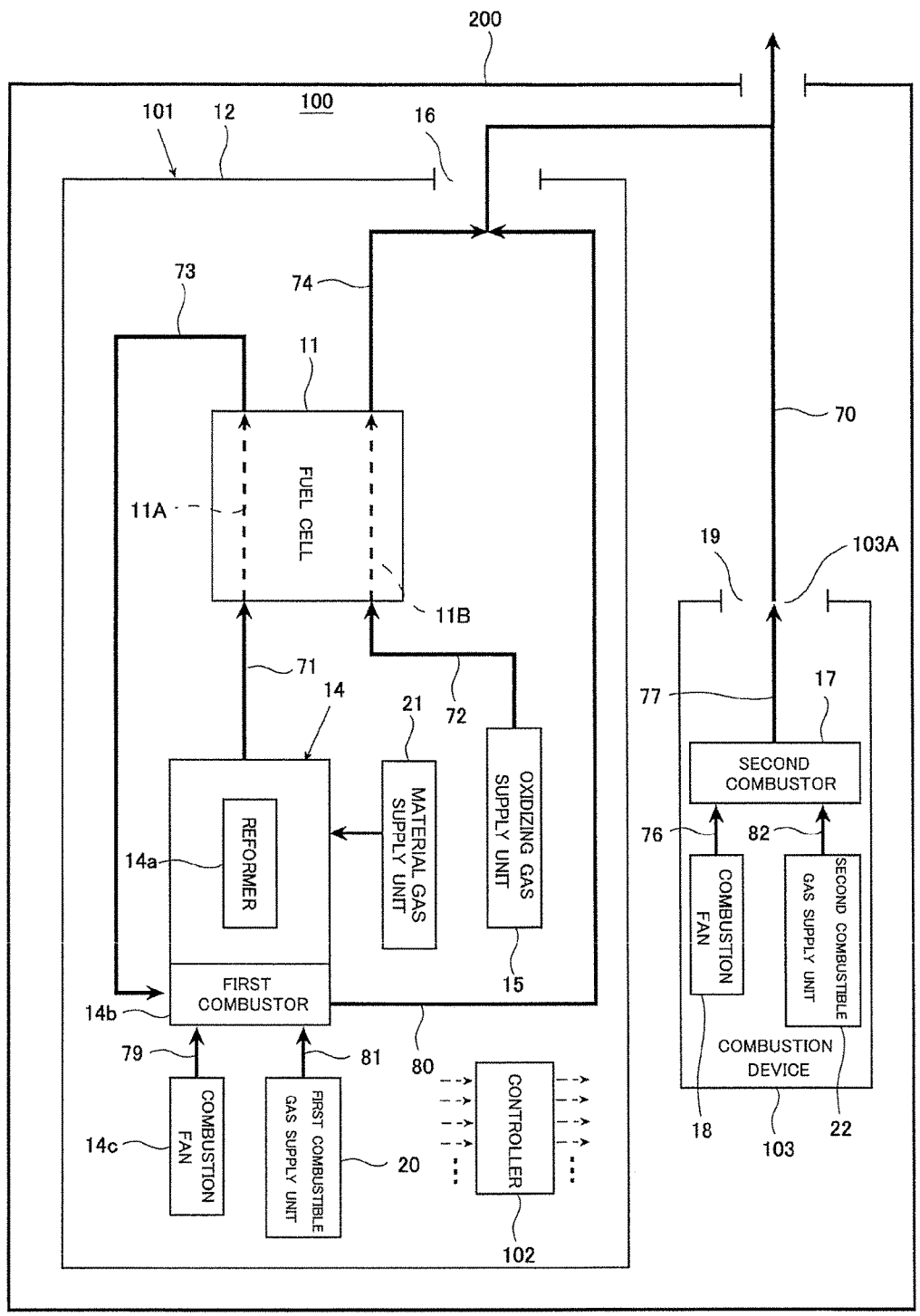
FIG. 1 is a schematic diagram showing a schematic configuration of a power generation system according to Embodiment 1 of the present invention.

Hereinafter, preferred embodiments of the present invention will be explained in reference to the drawings. In the drawings, the same reference signs are used for the same or corresponding components, and a repetition of the same explanation is avoided. In addition, in the drawings, only the components necessary to explain the present invention are shown, and the other component may be omitted. Further, the present invention is not limited to the embodiments below.

Embodiment 1

A power generation system according to Embodiment 1 of the present invention includes: a fuel cell unit including a fuel cell configured to generate electric power using a fuel gas and an oxidizing gas, a hydrogen generator including a first combustor and configured to generate the fuel gas supplied to the fuel cell, and a case configured to house at least the fuel cell and the hydrogen generator; a controller; a combustion unit arranged outside the case and including a second combustor configured to combust a combustible gas; and a discharge passage which is formed to cause the fuel cell unit and the combustion unit to communicate with each other and through which an exhaust gas discharged from the fuel cell unit and an exhaust gas discharged from the combustion unit are discharged to the atmosphere, wherein in a case where the controller causes one of the first combustor and the second combustor to perform an ignition operation, the controller maintains an operating state of the other combustor during a period of the ignition operation of the one combustor.

Herein, in a case where the combustor is performing a combustion operation, the "operating state of the combustor" denotes a state where the combustor is performing the combustion operation. In a case where the combustor is in a stop state, the "operating state of the combustor" denotes the stop state.

Moreover, the "ignition operation" denotes a series of operations including the supply of combustion air, the supply of a combustion fuel, such as a combustible gas, and the ignition of the combustible gas and the combustion air by an ignition unit, such as an ignitor.

Further, "during the period of the ignition operation" denotes a period in which the series of operations including the supply of the combustion air, the operation of the ignition unit, such as the ignitor, and the ignition of the combustion air and the combustion fuel by the supply of the combustion fuel, such as the combustible gas, are being performed. In this case, for example, in a case where the series of operations including the supply of the combustion air, the operation of the ignition unit, such as the ignitor, and the ignition of the combustion air and the combustion fuel by the supply of the combustion fuel, such as the combustible gas, are repeatedly performed, "during the period of the ignition operation" denotes a period in which the series of operations are being repeatedly performed a preset number of times.

The power generation system according to Embodiment 1 may be configured such that in a case where the controller causes one of the combustors to perform the ignition operation, the controller causes the flow rate of the exhaust gas discharged from the unit including the other combustor to become constant during the period of the ignition operation of the one combustor.

Herein, "the controller causes the flow rate of the exhaust gas discharged from the unit including the other combustor to become constant" does not denote that the flow rate of the exhaust gas discharged from the unit including the other combustor does not change at all but denotes that the flow rate of the exhaust gas is allowed to change to a level that the ignition operation of the combustor does not become unstable. Therefore, the flow rate of the exhaust gas discharged from the unit including the other combustor is generally allowed to change ±10% depending on devices constituting this unit and the configuration of the combustor.

In the power generation system according to Embodiment 1, in a case where the controller causes the one combustor to perform the ignition operation, the controller may cause a flow rate of the exhaust gas discharged from the unit including the other combustor between the fuel cell unit and the combustion unit to become constant during the period of the ignition operation of the one combustor.

In the power generation system according to Embodiment 1, in a case where the controller causes the one combustor to perform the ignition operation, and if an ignition operation command of the other combustor is input to the controller, the controller may not cause the other combustor to perform the ignition operation during the period of the ignition operation of the one combustor.

In the power generation system according to Embodiment 1, in a case where the controller causes the one combustor to perform the ignition operation, and if an ignition operation command of the other combustor is input to the controller, the controller may cause the one combustor to perform the ignition operation, and then cause the other combustor to perform the ignition operation.

In the power generation system according to Embodiment 1, in a case where the controller causes the one combustor to perform the ignition operation, and if a command for changing a flow rate of the exhaust gas discharged from the other combustor is input to the controller, the controller may cause the one combustor to perform the ignition operation, and then change the flow rate of the exhaust gas discharged from the other combustor.

In the power generation system according to Embodiment 1, in a case where the controller causes the first combustor to perform the ignition operation, the controller may control the combustion unit so as not to change a combustion amount of the second combustor during the period of the ignition operation of the first combustor.

Further, in the power generation system according to Embodiment 1, in a case where the controller causes the second combustor to perform the ignition operation, the controller may control the fuel cell unit so as not to change an electric power generation amount of the fuel cell during the period of the ignition operation of the second combustor.

Hereinafter, one example of the power generation system according to Embodiment 1 will be specifically explained.

Configuration of Power Generation System

FIG. 1 is a schematic diagram showing a schematic configuration of the power generation system according to Embodiment 1 of the present invention.

As shown in FIG. 1, a power generation system 100 according to Embodiment 1 of the present invention is provided inside a building 200. The power generation system 100 includes a fuel cell unit 101, a controller 102, a combustion unit 103, and a discharge passage 70. The fuel cell unit 101 includes a fuel cell 11, a hydrogen generator 14, and a case 12, and the combustion unit 103 includes a second combustor 17. The hydrogen generator 14 includes a first combustor 14b.

The discharge passage 70 is formed so as to cause the case 12 of the fuel cell unit 101 and an exhaust port 103A of the combustion unit 103 to communicate with each other. In a case where the controller 102 causes one of the first combustor 14b and the second combustor 17 to perform the ignition operation, the controller 102 causes the flow rate of the exhaust gas discharged from the unit including the other combustor to become constant during the period of the ignition operation of the one combustor.

Embodiment 1 has explained an example in which the power generation system 100 is provided inside the building 200. However, the present embodiment is not limited to this. The power generation system 100 may be provided outside the building 200 as long as the discharge passage 70 causes the case 12 of the fuel cell unit 101 and the exhaust port 103A of the combustion unit 103 to communicate with each other (to be connected to each other).

The fuel cell 11, the hydrogen generator 14, and an oxidizing gas supply unit 15 are provided inside the case 12 of the fuel cell unit 101. The controller 102 is also provided inside the case 12. In Embodiment 1, the controller 102 is provided inside the case 12 of the fuel cell unit 101. However, the present embodiment is not limited to this. For example, the controller 102 may be provided inside the combustion unit 103 or may be provided separately from the case 12 and the combustion unit 103.

At an appropriate position of a wall constituting the case 12, a hole 16 penetrating the wall in a thickness direction of the wall is formed. A pipe constituting the discharge passage 70 is inserted through the hole 16 such that a gap is formed between the hole 16 and the discharge passage 70. The gap between the hole 16 and the discharge passage 70 constitutes an air supply port 16. With this, the air outside the power generation system 100 is supplied through the air supply port 16 to the inside of the case 12.

In Embodiment 1, the hole through which the pipe constituting the discharge passage 70 is inserted and the hole constituting the air supply port 16 are configured as one hole 16. However, the present embodiment is not limited to this. The hole through which the pipe constituting the discharge passage 70 is inserted and the hole constituting the air supply port 16 may be separately formed at the case 12. The air supply port 16 may be formed at the case 12 by a single hole or a plurality of holes.

The hydrogen generator 14 includes a reformer 14a and the first combustor 14b. The reformer 14a generates the fuel gas from a hydrocarbon gas that is a material gas and steam. The first combustor 14b is configured to heat the reformer 14a. The first combustor 14b is constituted by a burner and includes an ignition unit, such as an ignitor, and an ignition detector, such as a flame rod (both not shown).

A combustion fan (first air supply unit) 14c is connected to the first combustor 14b through an air supply passage 79. The combustion fan 14c may have any configuration as long as it can supply the combustion air to the first combustor 14b. The combustion fan 14c may be constituted by a fan, a blower, or the like.

A first combustible gas supply unit 20 is connected to the first combustor 14b through a first combustible gas supply passage 81. Further, a downstream end of an off fuel gas passage 73 is connected to the first combustor 14b. With this, as described below, when starting up the fuel cell unit 101, the combustible gas (such as the hydrocarbon gas) is supplied from the first combustible gas supply unit 20 to the first combustor 14b, and after the power generation of the fuel cell 11 is started, the off fuel gas flows through the off fuel gas passage 73 to be supplied as the combustion fuel to the first combustor 14b.

The first combustible gas supply unit 20 may have any configuration as long as it can supply the combustible gas to the first combustor 14b. For example, the first combustible gas supply unit 20 may be constituted by a single pump or by a pump and a flow rate control valve. The combustible gas may be a natural gas, a LP gas, or the like.

The combustion fan (first air supply unit) 14c is connected to the first combustor 14b through the air supply passage 79. The combustion fan 14c may have any configuration as long as it can supply the combustion air to the first combustor 14b. The combustion fan 14c may be constituted by a fan, a blower, or the like.

The first combustor 14b combusts the supplied off fuel gas (or a first combustible gas) and the combustion air to generate a flue gas and heat. The flue gas generated by the first combustor 14b heats the reformer 14a and the like to be discharged to a flue gas passage 80. The flue gas discharged to the flue gas passage 80 flows through the flue gas passage 80 to be discharged to the discharge passage 70. The flue gas discharged to the discharge passage 70 flows through the discharge passage 70 to be discharged to the outside of the power generation system 100 (building 200).

A material gas supply unit 21 and a water supply unit (not shown) are connected to the reformer 14a, and the material gas and the water are supplied to the reformer 14a. A natural gas containing methane as a major component, a LP gas containing propane as a major component, or the like may be used as the material gas. The material gas supply unit 21 may have any configuration as long as it can supply the material gas to the reformer 14a. For example, the material gas supply unit 21 may be constituted by a single pump or by a pump and a flow rate control valve. The water supplied from the water supply unit to the reformer 14a is heated along the way to become steam.

The reformer 14a includes a reforming catalyst. The reforming catalyst may be any material as long as, for example, it can serve as a catalyst in a steam-reforming reaction by which the hydrogen-containing gas is generated from the material gas and the steam. Examples of the reforming catalyst include a ruthenium-based catalyst in which a catalyst carrier, such as alumina, supports ruthenium (Ru) and a nickel-based catalyst in which the same catalyst carrier as above supports nickel (Ni). A catalyst by which an autothermal reforming reaction can be performed may be used as the reforming catalyst of the reformer 14a.

In the reformer 14a, the hydrogen-containing gas is generated by the reforming reaction between the supplied material gas and water (steam). The generated hydrogen-containing gas flows as the fuel gas through a fuel gas supply passage 71 to be supplied to a fuel gas channel 11A of the fuel cell 11.

In Embodiment 1, the hydrogen-containing gas generated by the reformer 14a is supplied as the fuel gas to the fuel cell 11. However, the present embodiment is not limited to this. For example, Embodiment 1 may be configured such that the hydrogen-containing gas flowed through a shift converter and carbon monoxide remover provided in the hydrogen generator 14 is supplied to the fuel cell 11, the shift converter including a shift catalyst (such as a copper-zinc-based catalyst) for reducing carbon monoxide in the hydrogen-containing gas supplied from the reformer 14a, the carbon monoxide remover including an oxidation catalyst (such as a ruthenium-based catalyst) and/or a methanation catalyst (such as a ruthenium-based catalyst).

In Embodiment 1, the first combustible gas supply unit 20 is provided, and when starting up the fuel cell unit 101, the combustible gas is supplied from the first combustible gas supply unit 20 to the first combustor 14b. However, the present embodiment is not limited to this.

For example, the material gas supply unit 21 may also serve as the first combustible gas supply unit 20. In this case, when starting up the fuel cell unit 101, the combustible gas (herein, the material gas) is supplied from the material gas supply unit 21 through the reformer 14a of the hydrogen generator 14, the fuel gas supply passage 71, the fuel gas channel 11A of the fuel cell 11, and the off fuel gas passage 73 to the first combustor 14b.

For example, Embodiment 1 may be configured such that a bypass passage configured to connect the fuel gas supply passage 71 and the off fuel gas passage 73 is provided, and the material gas supply unit 21 serves as the first combustible gas supply unit 20. In this case, when starting up the fuel cell unit 101, the combustible gas (herein, the material gas) may be supplied from the material gas supply unit 21 through the reformer 14a of the hydrogen generator 14, the fuel gas supply passage 71, the bypass passage, and the off fuel gas passage 73 to the first combustor 14b. The flow of the material gas from the fuel gas supply passage 71 to the bypass passage may be switched in such a manner that valves, such as three-way valves, are provided on respective passage and are opened or closed.

The oxidizing gas supply unit 15 may have any configuration as long as it can supply the oxidizing gas (air) to the fuel cell 11 while adjusting the flow rate of the oxidizing gas. The oxidizing gas supply unit 15 may be constituted by a fan, a blower, or the like or by an oxygen bomb and a flow rate adjuster. In this case, the flow rate adjuster may be constituted by a single pump or by a pump and a flow rate control valve. The fuel cell 11 (to be precise, an inlet of an oxidizing gas channel 11B of the fuel cell 11) is connected to the oxidizing gas supply unit 15 through an oxidizing gas supply passage 72.

The fuel cell 11 includes an anode and a cathode (both not shown). In the fuel cell 11, the fuel gas supplied to the fuel gas channel 11A is supplied to the anode while the fuel gas flows through the fuel gas channel 11A. In addition, the oxidizing gas supplied to the oxidizing gas channel 11B is supplied to the cathode while the oxidizing gas flows through the oxidizing gas channel 11B. Then, the fuel gas supplied to the anode and the oxidizing gas supplied to the cathode react with each other to generate electricity and heat.

The generated electricity is supplied to an external electric power load (such as a domestic electrical apparatus) by an electric power conditioner, not shown. The generated heat is recovered by a heat medium flowing through a heat medium channel, not shown. The heat recovered by the heat medium can be used to, for example, heat water. Or, only the electricity generated by the fuel cell 11 may be utilized, and the heat may be discarded.

In Embodiment 1, each of various fuel cells, such as a polymer electrolyte fuel cell, a direct internal reforming type solid-oxide fuel cell, and an indirect internal reforming type solid-oxide fuel cell, may be used as the fuel cell 11. In Embodiment 1, the fuel cell 11 and the hydrogen generator 14 are configured separately. However, the present embodiment is not limited to this. Like a solid-oxide fuel cell, the hydrogen generator 14 and the fuel cell 11 may be configured integrally.

In this case, the fuel cell 11 and the hydrogen generator 14 are configured as one unit covered with a common heat insulating material, and the first combustor 14b can heat not only the reformer 14a but also the fuel cell 11. In the direct internal reforming type solid-oxide fuel cell, the anode of the fuel cell 11 serves as the reformer 14a, so that the anode of the fuel cell 11 and the reformer 14a may be configured integrally. Further, since the configuration of the fuel cell 11 is similar to that of a typical fuel cell, a detailed explanation thereof is omitted.

An upstream end of the off fuel gas passage 73 is connected to an outlet of the fuel gas channel 11A. A downstream end of the off fuel gas passage 73 is connected to the first combustor 14b. An upstream end of an off oxidizing gas passage 74 is connected to an outlet of the oxidizing gas channel 11B. A downstream end of the off oxidizing gas passage 74 is connected to the discharge passage 70.

With this, the fuel gas (hereinafter referred to as an "off fuel gas") unconsumed in the fuel cell 11 is supplied from the outlet of the fuel gas channel 11A through the off fuel gas passage 73 to the first combustor 14b. The oxidizing gas (hereinafter referred to as an "off oxidizing gas") unconsumed in the fuel cell 11 is discharged from the outlet of the oxidizing gas channel 11B through the off oxidizing gas passage 74 to the discharge passage 70. The off oxidizing gas discharged to the discharge passage 70 flows through the discharge passage 70 to be discharged to the outside of the building 200.

As above, in Embodiment 1, the off oxidizing gas is exemplified as the exhaust gas discharged from the fuel cell unit 101. The exhaust gas discharged from the fuel cell unit 101 is not limited to these gases. For example, the exhaust gas discharged from the fuel cell unit 101 may be a gas (the flue gas, the hydrogen-containing gas, or the like) discharged from the hydrogen generator 14 or a gas (mainly air) in the case 12.

The combustion unit 103 includes the second combustor 17 and a combustion fan (second air supply unit) 18. The second combustor 17 and the combustion fan 18 are connected to each other through a combustion air supply passage 76. The combustion fan 18 may have any configuration as long as it can supply the combustion air to the second combustor 17. The combustion fan 18 may be constituted by a fan, a blower, or the like. The second combustor 17 is constituted by a burner and includes an ignition unit, such as an ignitor, and an ignition detector, such as a flame rod (both not shown).

A second combustible gas supply unit 22 is connected to the second combustor 17 through a second combustible gas supply passage 82. For example, the second combustible gas supply unit 22 may be constituted by a single pump or by a pump and a flow rate control valve. A second combustible gas (combustion fuel) may be a natural gas, a LP gas, or the like.

The second combustor 17 combusts the combustion air supplied from the combustion fan 18 and the combustion fuel supplied from the second combustible gas supply unit 22 to generate the heat and the flue gas. The generated heat can be used to heat water. That is, the combustion unit 103 may be used as a boiler.

An upstream end of an exhaust gas passage 77 is connected to the second combustor 17, and a downstream end of the exhaust gas passage 77 is connected to the discharge passage 70. With this, the flue gas generated by the second combustor 17 is discharged through the exhaust gas passage 77 to the discharge passage 70. To be specific, the flue gas generated by the second combustor 17 is discharged to the discharge passage 70 as the exhaust gas discharged from the combustion unit 103. Then, the flue gas discharged to the discharge passage 70 flows through the discharge passage 70 to be discharged to the outside of the building 200.

The exhaust gas discharged from the combustion unit 103 is not limited to the flue gas. For example, the combustion air discharged to the discharge passage 70 in a case where only the combustion fan 18 is activated can also be exemplified as the exhaust gas. Moreover, for example, the combustion fuel discharged to the discharge passage 70 in a case where only a combustion fuel supply unit, not shown, is activated can also be exemplified as the exhaust gas.

At an appropriate position of a wall constituting the combustion unit 103, a hole 19 penetrating the wall in a thickness direction of the wall is formed. The pipe constituting the discharge passage 70 is inserted through the hole 19 such that a gap is formed between the hole 19 and the discharge passage 70. The gap between the hole 19 and the discharge passage 70 constitutes an air supply port 19. With this, the air outside the power generation system 100 is supplied through the air supply port 19 to the inside of the combustion unit 103.

To be specific, the discharge passage 70 branches, and two upstream ends thereof are respectively connected to the hole 16 and the hole 19. The discharge passage 70 is formed so as to extend to the outside of the building 200, and a downstream end (opening) thereof is open to the atmosphere. As above, the discharge passage 70 causes the case 12 and the exhaust port 103A of the combustion unit 103 to communicate with each other.

In Embodiment 1, the hole through which the pipe constituting the discharge passage 70 is inserted and the hole constituting the air supply port 19 are configured as one hole 19. However, the present embodiment is not limited to this. The hole through which the pipe constituting the discharge passage 70 is inserted (to which the pipe constituting the discharge passage 70 is connected) and the hole constituting the air supply port 19 may be separately formed at the combustion unit 103. The air supply port 19 may be formed at the combustion unit 103 by a single hole or a plurality of holes.

The controller 102 may be any device as long as it controls respective devices constituting the power generation system 100. The controller 102 includes a calculation processing module, such as a microprocessor or a CPU, and a storage module, such as a memory, configured to store programs for executing respective control operations. In the controller 102, the calculation processing module reads out and executes a predetermined control program stored in the storage module. Thus, the controller 102 processes the information and performs various control operations, such as the above control operations, regarding the power generation system 100.

The controller 102 may be constituted by a single controller or may be constituted by a group of a plurality of controllers which cooperate to execute control operations of the power generation system 100. The controller 102 may be constituted by a microcomputer or may be constituted by a MPU, a PLC (Programmable Logic Controller), a logic circuit, or the like.

Operations of Power Generation System

Next, the operations of the power generation system 100 according to Embodiment 1 will be explained. Since the electric power generating operation of the fuel cell unit 101 of the power generation system 100 is performed in the same manner as the electric power generating operation of a typical fuel cell, a detailed explanation thereof is omitted. In Embodiment 1, the controller 102 is constituted by a single controller and controls respective devices constituting the power generation system 100.

(1) In Case where Both First Combustor 14b and Second Combustor 17 are in Stop State, and Command for Activating Both Combustors is Input to Controller 102

In a case where the controller 102 causes one of the combustors to perform the ignition operation, the controller 102 causes the flow rate of the exhaust gas discharged from the unit including the other combustor to become constant during the period of the ignition operation of the one combustor. Specifically, in a case where the controller 102 causes one of the combustors to perform the ignition operation, and if an ignition operation command of the other combustor is input to the controller 102, the controller 102 does not cause the other combustor to perform the ignition operation during the period of the ignition operation of the one combustor.

More specifically, in a case where the controller 102 causes one of the combustors to perform the ignition operation, and if the ignition operation command of the other combustor is input to the controller 102, the controller 102 causes the other combustor to perform the ignition operation after causing the one combustor to perform the ignition operation. Herein, "after causing the combustor to perform the ignition operation" denotes a state after the ignition of the combustor has been confirmed. The ignition can be performed by, for example, a flame rod.

Hereinafter, a case where the ignition operation command of the second combustor 17 is input when the first combustor 14b is caused to perform the ignition operation and a case where the ignition operation command of the first combustor 14b is input when the second combustor 17b is caused to perform the ignition operation will be specifically explained in reference to FIGS. 1 to 3.

Figure 2:
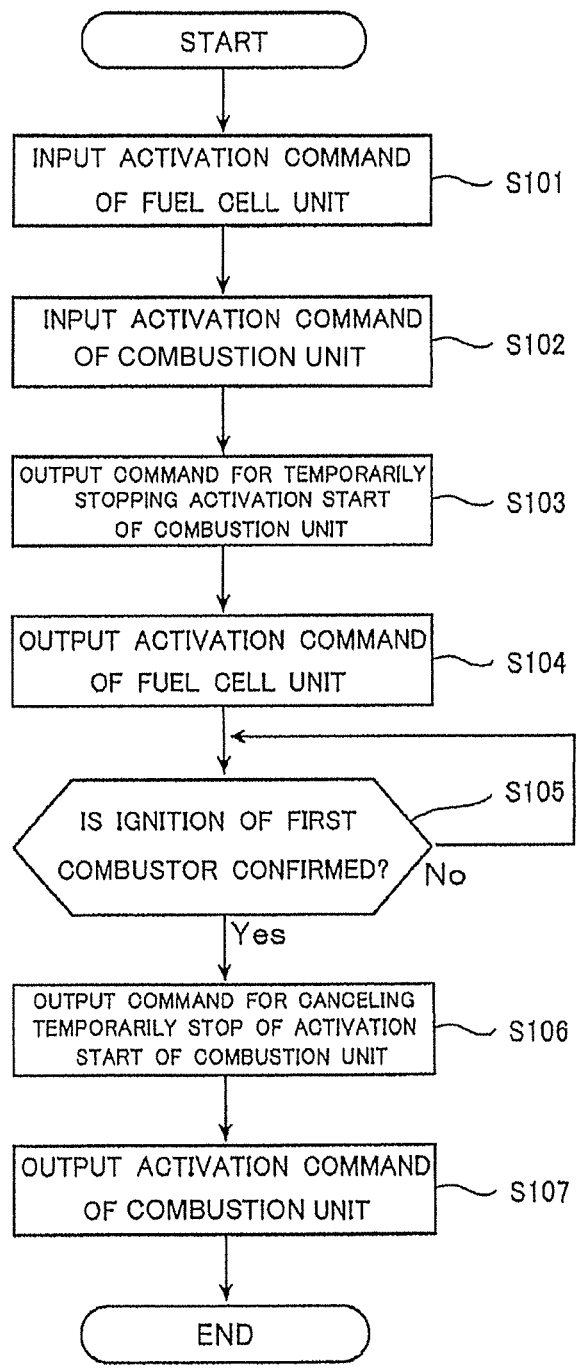
FIG. 2 is a flow chart showing one example of an operation of the power generation system according to Embodiment 1.

(1-1) In Case where Ignition Operation Command of Second Combustor 17 is Input when First Combustor 14b is Caused to Perform Ignition Operation FIG. 2 is a flow chart showing one example of the operation of the power generation system according to Embodiment 1.

As shown in FIG. 2, first, an activating command of the fuel cell unit 101 is input to the controller 102 (Step S101), and an activating command of the combustion unit 103 is input to the controller 102 (Step S102). Examples of the case where the activating commands of the fuel cell unit 101 and the combustion unit 103 are input to the controller 102 include a case where a user or the like of the power generation system 100 operates a remote controller, not shown in FIG. 1, to instruct an operation start of the fuel cell unit 101 and the combustion unit 103 or a case where a preset operation start time of the power generation system 100 has come.

The controller 102 temporarily stops an activation start of the combustion unit 103 (Step S103). Then, the controller 102 outputs an activation start command of the fuel cell unit 101 to respective devices constituting the fuel cell unit 101 (Step S104).

Thus, the operation of the fuel cell unit 101 is started. Specifically, first, the combustion fan 14c is activated, so that the combustion air flows through the air supply passage 79 to be supplied to the first combustor 14b. Next, the ignition unit (not shown in FIG. 1) of the first combustor 14b is activated. Then, the first combustible gas supply unit 20 is activated, so that the combustible gas (combustion fuel) flows through the first combustible gas supply passage 81 to be supplied to the first combustor 14b. When the combustible gas is supplied to the first combustor 14b, the first combustor 14b ignites the combustible gas and the combustion air to combust a fuel-air mixture of the combustible gas and the combustion air.

When an ignition detection of the first combustor 14b is input to the controller 102 by the ignition detector, not shown, of the first combustor 14b (Yes in Step S105), the controller 102 cancels the temporary stop of the activation start of the combustion unit 103 (Step S106). Next, the controller 102 outputs the activation start command of the combustion unit 103 to respective devices constituting the combustion unit 103 (Step S107).

With this, the combustion fan 18 is activated, so that the combustion air flows through the combustion air supply passage 76 to be supplied to the second combustor 17. Next, the ignitor (not shown in FIG. 1) of the second combustor 17 is activated. Then, the second combustible gas supply unit 22 is activated, so that the combustion fuel is supplied to the second combustor 17. When the combustion fuel is supplied to the second combustor 17, the second combustor 17 ignites the combustion fuel and the combustion air to combust the fuel-air mixture of the combustion fuel and the combustion air.

In the fuel cell unit 101, after the ignition of the first combustor 14b, respective operations are performed, that is, for example, the hydrogen generator 14 generates the fuel gas to supply the fuel gas to the fuel gas channel 11A. Since these operations are the same as the electric power generating operations of a typical fuel cell, detailed explanations thereof are omitted. In the combustion unit 103, the second combustor 17 starts the combustion to generate the flue gas. The generated flue gas is discharged to the discharge passage 70 to be discharged to the outside of the building 200 (power generation system 100).

As above, when performing the ignition operation of the first combustor 14b, the start of the ignition operation of the second combustor 17 is temporarily stopped. With this, the stop state of the second combustor 17 is maintained, and the flow rate of the exhaust gas discharged from the combustion unit 103 to the discharge passage 70 can be caused to become constant (in this case, the flow rate of the exhaust gas is zero). On this account, the ignition operation of the first combustor 14b can be stably performed.

Figure 3:
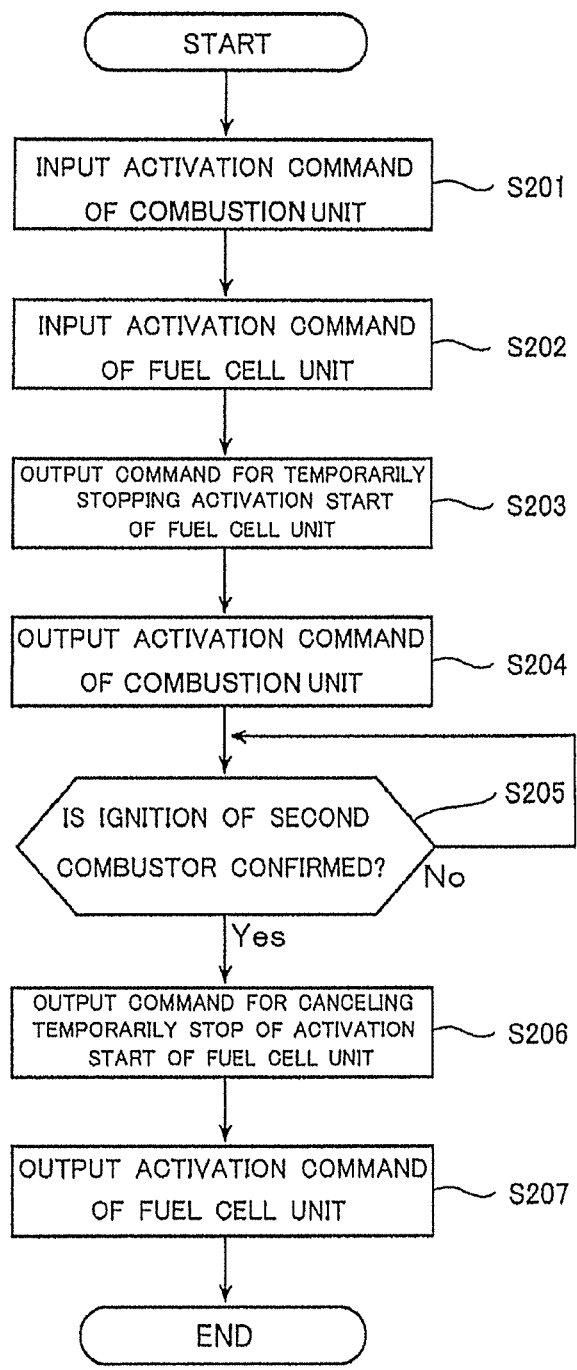
FIG. 3 is a flow chart showing one example of the operation of the power generation system according to Embodiment 1.

(1-2) In Case where Ignition Operation Command of First Combustor 14b is Input when Second Combustor 17b is Caused to Perform Ignition Operation FIG. 3 is a flow chart showing one example of the operation of the power generation system according to Embodiment 1.

As shown in FIG. 3, first, the activating command of the combustion unit 103 is input to the controller 102 (Step S201), and the activating command of the fuel cell unit 101 is input to the controller 102 (Step S202).

The controller 102 temporarily stops the activation start of the fuel cell unit 101 (Step S203). Then, the controller 102 outputs the activation start command of the combustion unit 103 to respective devices constituting the combustion unit 103 (Step S204).

With this, the combustion fan 18 is activated, so that the combustion air flows through the combustion air supply passage 76 to be supplied to the second combustor 17. Next, the ignition unit (not shown in FIG. 1) of the second combustor 17 is activated. Then, the second combustible gas supply unit 22 is activated, so that the combustion fuel is supplied to the second combustor 17. When the combustion fuel is supplied to the second combustor 17, the second combustor 17 ignites the combustion fuel and the combustion air to combust the fuel-air mixture of the combustion fuel and the combustion air.

When an ignition detection of the second combustor 17 is input to the controller 102 by the ignition detector, not shown, of the second combustor 17 (Yes in Step S205), the controller 102 cancels the temporary stop of the activation start of the fuel cell unit 101 (Step S206). Next, the controller 102 outputs the activation start command of the fuel cell unit 101 to respective devices constituting the fuel cell unit 101 (Step S207).

With this, the operation of the fuel cell unit 101 is started. Specifically, first, the combustion fan 14c is activated, so that the combustion air flows through the air supply passage 79 to be supplied to the first combustor 14b. Next, the ignition unit (not shown in FIG. 1) of the first combustor 14b is activated. Then, the first combustible gas supply unit 20 is activated, so that the combustible gas (combustion fuel) flows through the first combustible gas supply passage 81 to be supplied to the first combustor 14b. When the combustible gas is supplied to the first combustor 14b, the first combustor 14b ignites the combustible gas and the combustion air to combust the fuel-air mixture of the combustible gas and the combustion air.

In the fuel cell unit 101, after the ignition of the first combustor 14b, respective operations are performed, that is, for example, the hydrogen generator 14 generates the fuel gas to supply the fuel gas to the fuel gas channel 11A. Since these operations are the same as the electric power generating operations of a typical fuel cell, detailed explanations thereof are omitted. In the combustion unit 103, the second combustor 17 starts the combustion to generate the flue gas. The generated flue gas is discharged to the discharge passage 70 to be discharged to the outside of the building 200 (power generation system 100).

As above, when performing the ignition operation of the second combustor 17, the start of the ignition operation of the first combustor 14b is temporarily stopped. With this, the stop state of the first combustor 14b is maintained, and the flow rate of the exhaust gas discharged from the fuel cell unit 101 to the discharge passage 70 can be caused to become constant (in this case, the flow rate of the exhaust gas is zero). On this account, the ignition operation of the second combustor 17 can be stably performed.

Even in a case where both the first combustor 14b and the second combustor 17 are in a stop state, and during the period of the ignition operation of one of the combustors, the activating command of the other combustor is input to the controller 102, the controller 102 controls the other combustor in the same manner as above. To be specific, until the ignition of one of the combustors is confirmed, the controller 102 temporarily stops the activation start of the other combustor. When the ignition of one of the combustors is confirmed, the controller 102 starts the ignition operation of the other combustor.

(2) In Case where One of First Combustor 14b and Second Combustor 17 is Operating, and Command for Activating the Other Combustor is Input to Controller 102

In a case where the controller 102 causes one of the combustors to perform the ignition operation, the controller 102 maintains the operating state of the other combustor during the period of the ignition operation of the one combustor. Specifically, in a case where the controller 102 causes one of the combustors to perform the ignition operation, and if a command for changing a manipulation amount of the other combustor is input to the controller 102, the controller 102 does not change the manipulation amount of the other combustor during the period of the ignition operation of the one combustor.

More specifically, in a case where the controller 102 causes one of the combustors to perform the ignition operation, and if a command for changing the flow rate of the exhaust gas discharged from the other combustor is input to the controller 102, the controller 102 changes the flow rate of the exhaust gas discharged from the other combustor after causing the one combustor to perform the ignition operation.

Hereinafter, a case where a manipulation amount change command of the second combustor 17 (a flow rate change command of the exhaust gas discharged from the second combustor 17) is input when the first combustor 14b is caused to perform the ignition operation and a case where a manipulation amount change command of the first combustor 14b (a flow rate change command of the exhaust gas discharged from the first combustor 14b) is input when the second combustor 17b is caused to perform the ignition operation will be specifically explained in reference to FIGS. 1, 4, and 5.

Figure 4:
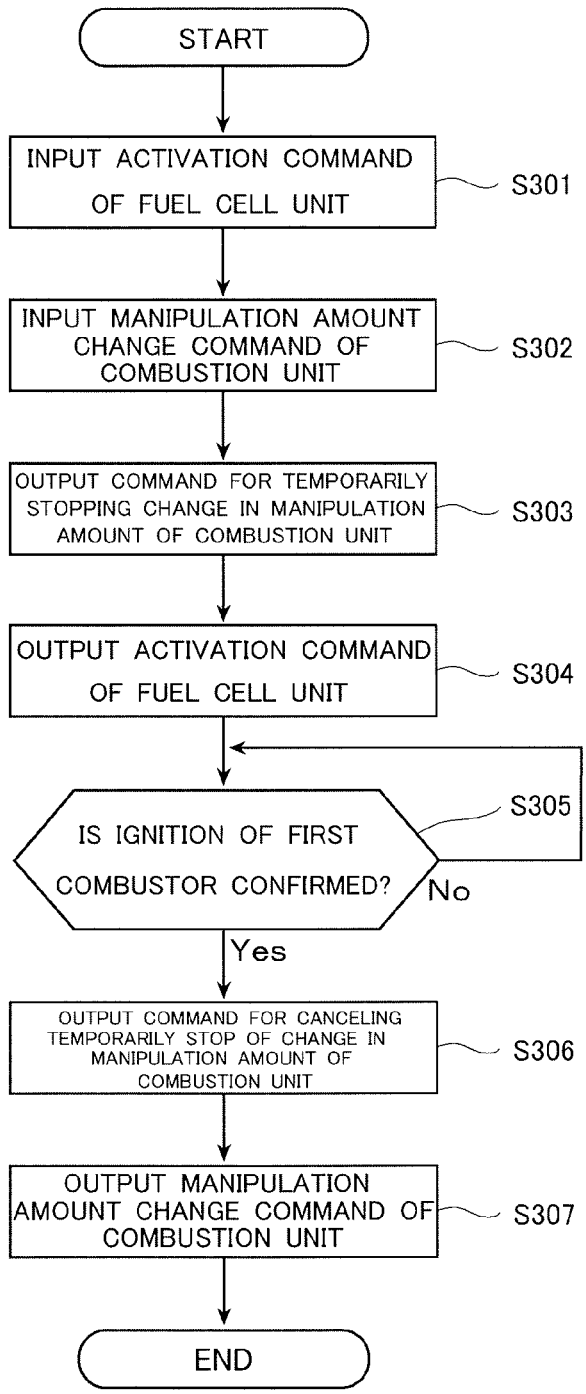
FIG. 4 is a flow chart showing one example of the operation of the power generation system according to Embodiment 1.

(2-1) In Case where Manipulation Amount Change Command of Second Combustor 17 is Input when First Combustor 14b is Caused to Perform Ignition Operation FIG. 4 is a flow chart showing one example of the operation of the power generation system according to Embodiment 1.

As shown in FIG. 4, first, the activating command of the fuel cell unit 101 is input to the controller 102 (Step S301), and the manipulation amount change command of the combustion unit 103 is input to the controller 102 (Step S302). In this case, the order of Steps S301 and S302 may be changed.

The controller 102 temporarily stops the change in the manipulation amount of the combustion unit 103 (Step S303). Then, the controller 102 outputs the activation start command of the fuel cell unit 101 to respective devices constituting the fuel cell unit 101 (Step S304).

With this, the operation of the fuel cell unit 101 is started. Specifically, first, the combustion fan 14c is activated, so that the combustion air flows through the air supply passage 79 to be supplied to the first combustor 14b. Next, the ignition unit (not shown in FIG. 1) of the first combustor 14b is activated. Then, the first combustible gas supply unit 20 is activated, so that the combustible gas flows through the first combustible gas supply passage 81 to be supplied to the first combustor 14b. When the combustible gas is supplied to the first combustor 14b, the first combustor 14b ignites the combustible gas and the combustion air to combust the fuel-air mixture of the combustible gas and the combustion air.

When the ignition detection of the first combustor 14b is input to the controller 102 by the ignition detector, not shown, of the first combustor 14b (Yes in Step S305), the controller 102 cancels the temporary stop of the change in the manipulation amount of the combustion unit 103 (Step S306). Next, the controller 102 outputs the manipulation amount change command of the combustion unit 103 to respective devices constituting the combustion unit 103 (Step S307).

Specifically, a combustion amount of the second combustor 17 is changed. More specifically, the combustion amount of the second combustor 17 is changed by changing the manipulation amounts of the combustion fan 18 and the second combustible gas supply unit 22. With this, the flow rate of the exhaust gas discharged from the second combustor 17 changes.

As above, when the first combustor 14b performs the ignition operation, the change in the combustion amount of the second combustor 17 is temporarily stopped. With this, the operating state of the second combustor 17 is maintained, and the flow rate of the exhaust gas discharged from the combustion unit 103 to the discharge passage 70 can be caused to become constant (in this case, the flow rate of the exhaust gas is a predetermined flow rate (specifically, the flow rate of the exhaust gas is a flow rate before a command for changing the manipulation amount of the combustion unit 103 is input)). On this account, the ignition operation of the first combustor 14b can be stably performed.

In the fuel cell unit 101, after the ignition of the first combustor 14b, respective operations are performed, that is, for example, the hydrogen generator 14 generates the fuel gas to supply the fuel gas to the fuel gas channel 11A. Since these operations are the same as the electric power generating operations of a typical fuel cell, detailed explanations thereof are omitted.

Figure 5:
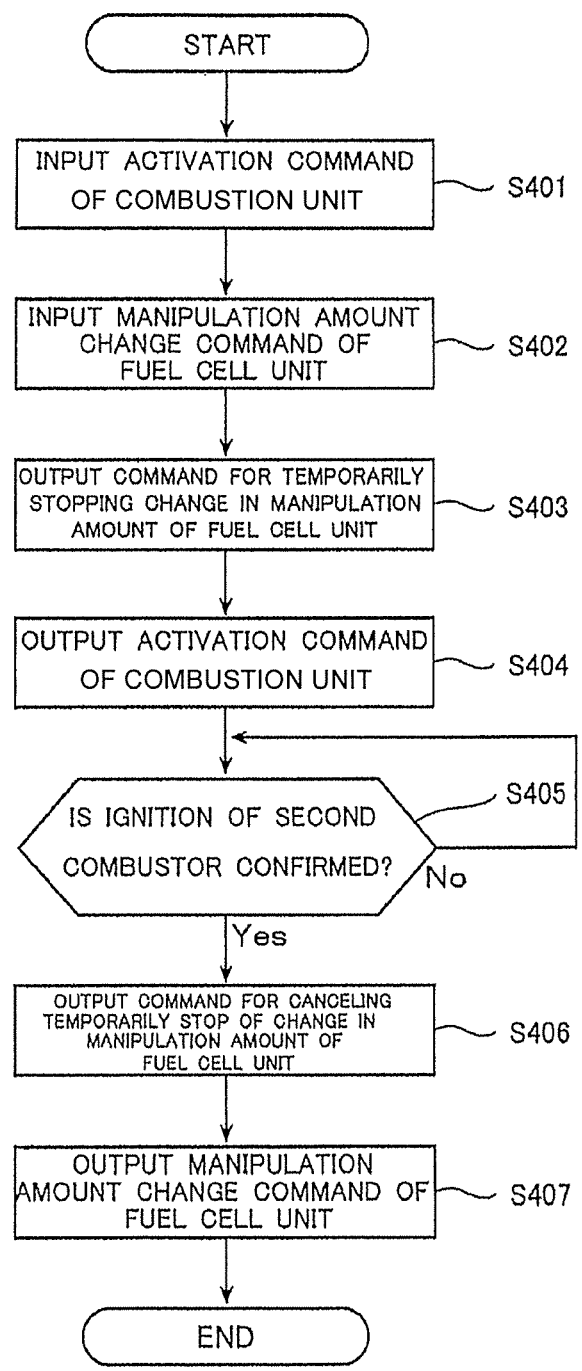
FIG. 5 is a flow chart showing one example of the operation of the power generation system according to Embodiment 1.

(2-2) In Case where Manipulation Amount Change Command of First Combustor 14b (Electric Power Generation Amount Change Command of Fuel Cell 11) is Input when Second Combustor 17 is Caused to Perform Ignition Operation FIG. 5 is a flow chart showing one example of the operation of the power generation system according to Embodiment 1.

As shown in FIG. 5, first, the activating command of the combustion unit 103 is input to the controller 102 (Step S401), and the manipulation amount change command of the fuel cell unit 101 (the electric power generation amount change command of the fuel cell 11) is input to the controller 102 (Step S402). In this case, the order of Steps S401 and S402 may be changed.

The controller 102 temporarily stops the change in the manipulation amount of the fuel cell unit 101 (Step S403). Then, the controller 102 outputs the activation start command of the combustion unit 103 to respective devices constituting the combustion unit 103 (Step S404).

With this, the combustion fan 18 is activated, so that the combustion air flows through the combustion air supply passage 76 to be supplied to the second combustor 17. Next, the ignition unit (not shown in FIG. 1) of the second combustor 17 is activated. Then, the second combustible gas supply unit 22 is activated, so that the combustion fuel is supplied to the second combustor 17. When the combustion fuel is supplied to the second combustor 17, the second combustor 17 ignites the combustion fuel and the combustion air to combust the fuel-air mixture of the combustion fuel and the combustion air.

When the ignition detection of the second combustor 17 is input to the controller 102 by the ignition detector, not shown, of the second combustor 17 (Yes in Step S405), the controller 102 cancels the temporary stop of the change in the manipulation amount of the fuel cell unit 101 (Step S406). Next, the controller 102 outputs the manipulation amount change command of the fuel cell unit 101 to respective devices constituting the fuel cell unit 101 (Step S407).

Specifically, the electric power generation amount of the fuel cell 11 is changed. More specifically, the flow rate of the fuel gas generated by the hydrogen generator 14 and the flow rate of the oxidizing gas supplied from the oxidizing gas supply unit 15 to the fuel cell 11 are changed. To change the flow rate of the fuel gas generated by the hydrogen generator 14, the manipulation amounts of the material gas supply unit 21, the water supply unit (not shown), and the combustion fan 14*c* are changed.

As above, when the second combustor 17 performs the ignition operation, the change in the manipulation amount of the fuel cell unit 101 (the change in the electric power generation amount of the fuel cell 11) is temporarily stopped. With this, the operating state of the fuel cell unit 101 is maintained, and the flow rate of the exhaust gas discharged from the fuel cell unit 101 to the discharge passage 70 can be caused to become constant (in this case, the flow rate of the exhaust gas is a predetermined flow rate (specifically, the flow rate of the exhaust gas is a flow rate before a command for changing the manipulation amount of the fuel cell unit 101 is input)). On this account, the ignition operation of the second combustor 17 can be stably performed.

The power generation system 100 according to Embodiment 1 configured as above is configured such that during the period of the ignition operation of one of the combustors, the flow rate of the exhaust gas discharged from the unit including the other combustor is caused to become constant. Therefore, even if a command for changing the operating state of the unit including the other combustor is output, the ignition operation of the one combustor can be stably performed.

Embodiment 2

The power generation system according to Embodiment 2 of the present invention is configured such that: the fuel cell unit includes a ventilator configured to ventilate the inside of the case by discharging a gas in the case to the discharge passage; and in a case where the controller causes the second combustor to perform the ignition operation, the controller does not change the manipulation amount of the ventilator during the period of the ignition operation of the second combustor.

Hereinafter, one example of the power generation system according to Embodiment 2 will be specifically explained.

Configuration of Power Generation System

Figure 6:
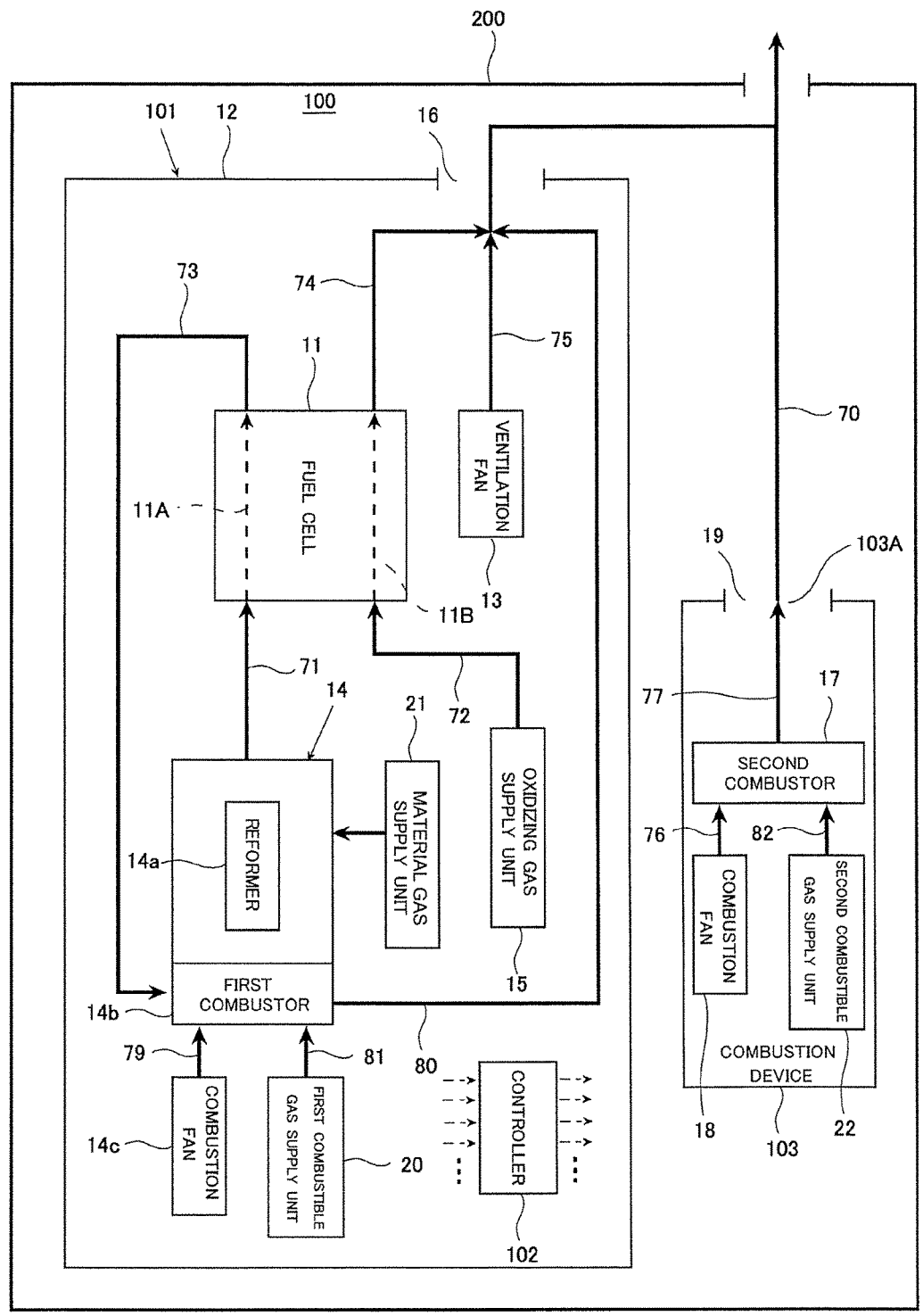
FIG. 6 is a schematic diagram showing a schematic configuration of the power generation system according to Embodiment 2 of the present invention.

FIG. 6 is a schematic diagram showing a schematic configuration of the power generation system according to Embodiment 2 of the present invention.

As shown in FIG. 6, the power generation system 100 according to Embodiment 2 of the present invention is the same in basic configuration as the power generation system 100 according to Embodiment 1 but is different from the power generation system 100 according to Embodiment 1 regarding the configuration of the fuel cell unit 101. Specifically, a ventilation fan (ventilator) 13 is provided in the case 12.

The ventilation fan 13 is connected to the discharge passage 70 through a ventilation passage 75. The ventilation fan 13 may have any configuration as long as it can ventilate the inside of the case 12. With this, the air outside the power generation system 100 is supplied through the air supply port 16 to the inside of the case 12, and the ventilation fan 13 is activated, so that the gas (mainly air) inside the case 12 is discharged through the ventilation passage 75 and the discharge passage 70 to the outside of the building 200. Thus, the inside of the case 12 is ventilated.

In Embodiment 1, a fan is used as the ventilator. However, the present embodiment is not limited to this, and a blower may be used as the ventilator. The ventilation fan 13 is provided inside the case 12. However, the present embodiment is not limited to this. The ventilation fan 13 may be provided inside the discharge passage 70. In this case, it is preferable that the ventilation fan 13 be provided upstream of a branch portion of the discharge passage 70.

Operations of Power Generation System

Next, the operations of the power generation system 100 according to Embodiment 2 will be explained. The following will explain a case where the electric power generation amount of the fuel cell 11 does not change.

When the controller 102 causes the second combustor 17 to perform the ignition operation, the controller 102 causes the flow rate of the exhaust gas discharged from the fuel cell unit 101 to become constant during the period of the ignition operation of the second combustor 17. Specifically, when the controller 102 causes the second combustor 17 to perform the ignition operation, the controller 102 does not change the manipulation amount of the ventilation fan 13 during the period of the ignition operation of the second combustor 17. Hereinafter, the control of the ventilation fan 13 and the second combustor 17 by the controller 102 will be specifically explained in reference to FIGS. 6 to 8.

(1) In Case where Both Ventilation Fan 13 and Second Combustor 17 are in Stop State, and Command for Activating Both Ventilation Fan 13 and Second Combustor 17 are Input to Controller 102

Figure 7:
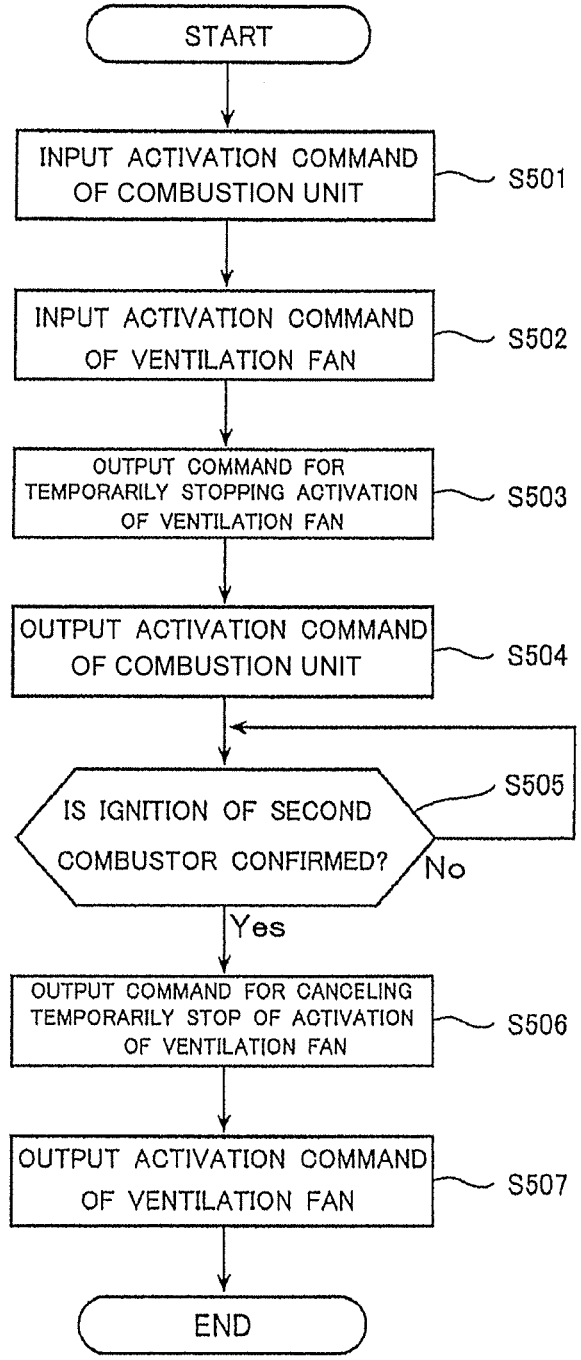
FIG. 7 is a flow chart showing one example of the operation of the power generation system according to Embodiment 2.

FIG. 7 is a flow chart showing one example of the operation of the power generation system according to Embodiment 2.

As shown in FIG. 7, first, the activating command of the combustion unit 103 is input to the controller 102 (Step S501), and the activating command of the ventilation fan 13 is input to the controller 102 (Step S502).

The controller 102 temporarily stops the activation start of the ventilation fan 13 (Step S503). Then, the controller 102 outputs the activation start command of the combustion unit 103 to respective devices constituting the combustion unit 103 (Step S504).

With this, the combustion fan 18 is activated, so that the combustion air flows through the combustion air supply passage 76 to be supplied to the second combustor 17. Next, the ignition unit (not shown in FIG. 1) of the second combustor 17 is activated. Then, the second combustible gas supply unit 22 is activated, so that the combustion fuel is supplied to the second combustor 17. When the combustion fuel is supplied to the second combustor 17, the second combustor 17 ignites the combustion fuel and the combustion air to combust the fuel-air mixture of the combustion fuel and the combustion air.

When the ignition detection of the second combustor 17 is input to the controller 102 by the ignition detector, not shown, of the second combustor 17 (Yes in Step S505), the controller 102 cancels the temporary stop of the activation start of the ventilation fan 13 (Step S506). Next, the controller 102 outputs the activation start command to the ventilation fan 13 (Step S507).

With this, the ventilation fan 13 is activated, so that the gas (mainly air) in the case 12 is discharged through the ventilation passage 75 to the discharge passage 70 to be discharged to the outside of the building 200 (power generation system 100).

As above, when the second combustor 17 performs the ignition operation, the activation start of the ventilation fan 13 is temporarily stopped. With this, the stop state of the ventilation fan 13 is maintained, and the flow rate of the exhaust gas discharged from the fuel cell unit 101 to the discharge passage 70 can be caused to become constant (in this case, the flow rate of the exhaust gas is zero). On this account, the ignition operation of the second combustor 17 can be stably performed.

Even in a case where both the ventilation fan 13 and the second combustor 17 are in a stop state, and during the period of the ignition operation of the second combustor 17, the activating command of the ventilation fan 13 is input to the controller 102, as with the above, the controller 102 temporarily stops the activation start of the ventilation fan 13 until the ignition of the second combustor 17 is confirmed. When the ignition of the second combustor 17 is confirmed, the operation of the ventilation fan 13 is started.

(2) In Case where Ventilation Fan 13 is Operating, and Command for Activating Second Combustor 17 is Input to Controller 102 (in Case where Manipulation Amount Change Command of Ventilation Fan 13 is Input when Causing Second Combustor 17 to Perform Ignition Operation)

Figure 8:
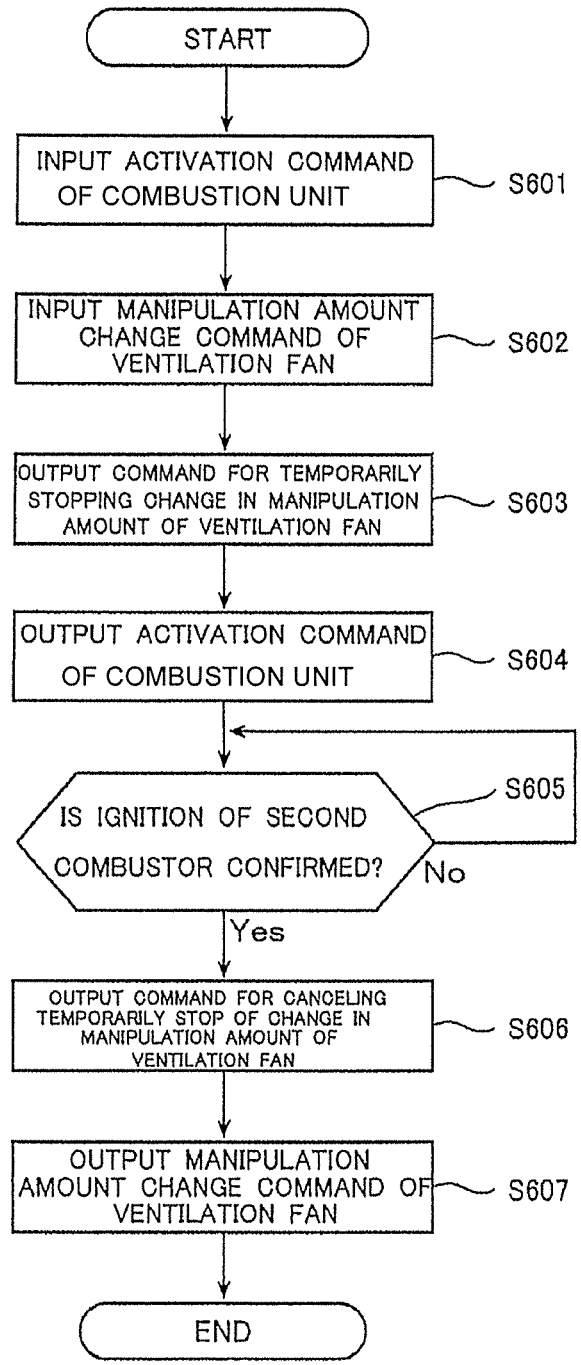
FIG. 8 is a flow chart showing one example of the operation of the power generation system according to Embodiment 2.

FIG. 8 is a flow chart showing one example of the operation of the power generation system according to Embodiment 2.

As shown in FIG. 8, first, the activating command of the combustion unit 103 is input to the controller 102 (Step S601), and the manipulation amount change command of the ventilation fan 13 is input to the controller 102 (Step S602). In this case, the order of Steps S601 and S602 may be changed.

The controller 102 temporarily stops the change in the manipulation amount of the ventilation fan 13 (Step S603). Then, the controller 102 outputs the activation start command of the combustion unit 103 to respective devices constituting the combustion unit 103 (Step S604).

With this, the combustion fan 18 is activated, so that the combustion air flows through the combustion air supply passage 76 to be supplied to the second combustor 17. Next, the ignition unit (not shown in FIG. 1) of the second combustor 17 is activated. Then, the second combustible gas supply unit 22 is activated, so that the combustion fuel is supplied to the second combustor 17. When the combustion fuel is supplied to the second combustor 17, the second combustor 17 ignites the combustion fuel and the combustion air to combust the fuel-air mixture of the combustion fuel and the combustion air.

When the ignition detection of the second combustor 17 is input to the controller 102 by the ignition detector, not shown, of the second combustor 17 (Yes in Step S605), the controller 102 cancels the temporary stop of the change in the manipulation amount of the ventilation fan 13 (Step S606). Next, the controller 102 outputs the manipulation amount change command to the ventilation fan 13 (Step S607).

With this, the manipulation amount of the ventilation fan 13 changes, so that the flow rate of the exhaust gas discharged from the fuel cell unit 101 to the discharge passage 70 changes.

As above, when the second combustor 17 performs the ignition operation, the change in the manipulation amount of the ventilation fan 13 is temporarily stopped. With this, the operating state of the ventilation fan 13 is maintained, and the flow rate of the exhaust gas discharged from the ventilation fan 13 to the discharge passage 70 can be caused to become constant (in this case, the flow rate of the exhaust gas is a predetermined flow rate (specifically, the flow rate of the exhaust gas is a flow rate before a command for changing the manipulation amount of the ventilation fan 13 is input)). On this account, the ignition operation of the second combustor 17 can be stably performed.

The power generation system 100 according to Embodiment 2 configured as above can also obtain the same operational advantages as the power generation system 100 according to Embodiment 1.

Embodiment 2 has explained the control of the ventilation fan 13 and the combustion unit 103 by the controller 102 in a case where the manipulation amount of the ventilation fan 13 changes when the manipulation amount of the fuel cell unit 101 (the electric power generation amount of the fuel cell 11) is not changing (that is, in a case where the manipulation amount of the ventilation fan 13 changes regardless of the manipulation amount of the fuel cell unit 101). However, the control of the ventilation fan 13 and the combustion unit 103 by the controller 102 is not limited to this. For example, in a case where the manipulation amount of the ventilation fan 13 changes in accordance with the manipulation amount of the fuel cell unit 101 (the electric power generation amount of the fuel cell 11), the controller 102 may operate in the same manner as the power generation system 100 according to Embodiment 1. Specifically, the controller 102 may be configured to control the manipulation amount of the ventilation fan 13 when controlling the manipulation amount of the fuel cell unit 101.

Embodiment 3

The power generation system according to Embodiment 3 of the present invention is configured such that: the fuel cell unit includes a ventilator configured to ventilate an inside of the fuel cell unit by discharging a gas in the fuel cell unit to the discharge passage, an oxidizing gas supply unit configured to supply the oxidizing gas to a cathode of the fuel cell, a first air supply unit configured to supply air to the first combustor, and a first combustible gas supply unit configured to supply the combustible gas to the first combustor; the discharge passage is configured such that a gas in the case, an off oxidizing gas discharged from the cathode, and an off combustion gas discharged from the first combustor are discharged to the atmosphere; and in a case where the controller changes an electric power generation amount of the fuel cell unit during the period of the ignition operation of the second combustor, the controller changes manipulation amounts of the ventilator, the oxidizing gas supply unit, the first air supply unit, and the first combustible gas supply unit to cause the flow rate of the exhaust gas discharged from the fuel cell unit to become constant.

In the power generation system according to Embodiment 3, in a case where the controller increases the electric power generation amount of the fuel cell unit during the period of the ignition operation of the second combustor, the controller may increase the manipulation amounts of the oxidizing gas supply unit, the first air supply unit, and the first combustible gas supply unit and decrease the manipulation amount of the ventilator, and in a case where the controller decreases the electric power generation amount of the fuel cell unit during the period of the ignition operation of the second combustor, the controller may decrease the manipulation amounts of the oxidizing gas supply unit, the first air supply unit, and the first combustible gas supply unit and increase the manipulation amount of the ventilator.

Hereinafter, one example of the power generation system according to Embodiment 3 will be specifically explained. Since the configuration of the power generation system according to Embodiment 3 is the same as the configuration of the power generation system according to Embodiment 2, a detailed explanation thereof is omitted.

Operations of Power Generation System

In a case where the controller 102 changes the electric power generation amount of the fuel cell unit 101 during the period of the ignition operation of the second combustor 17, the controller 102 changes the manipulation amounts of the ventilation fan 13, the first combustible gas supply unit 20, the oxidizing gas supply unit 15, and the combustion fan 14c to cause the flow rate of the exhaust gas discharged from the fuel cell unit 101 to become constant. Hereinafter, the control of the fuel cell unit 101 and the combustion unit 103 by the controller 102 will be specifically explained in reference to FIGS. 9 and 10. As described above, in a case where the material gas supply unit 21 also serves as the first combustible gas supply unit 20, the manipulation amount of the material gas supply unit 21 is changed instead of the first combustible gas supply unit 20.

(1) In Case where Command for Increasing Electric Power Generation Amount of Fuel Cell Unit 101 is Input to Controller 102 During Period of Ignition Operation of Second Combustor 17

Figure 9:
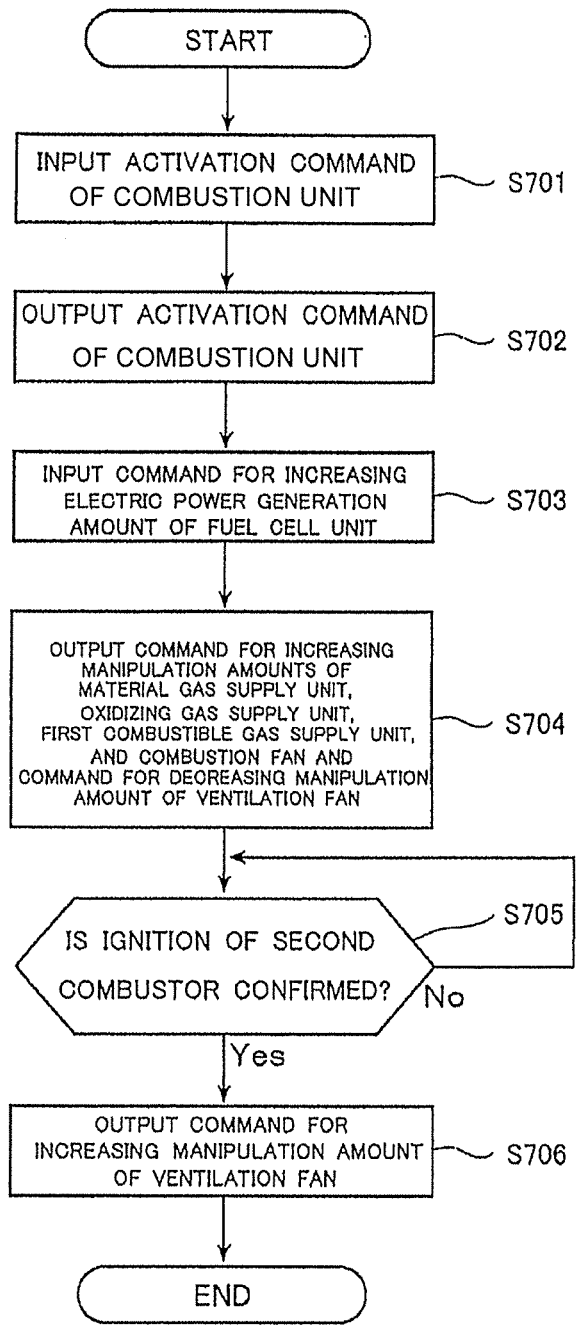
FIG. 9 is a flow chart showing one example of the operation of the power generation system according to Embodiment 3.

FIG. 9 is a flow chart showing one example of the operation of the power generation system according to Embodiment 3.

As shown in FIG. 9, first, when the activating command of the combustion unit 103 is input to the controller 102 during the operation of the fuel cell unit 101 (Step S701), the controller 102 outputs the activation start command of the combustion unit 103 to respective devices constituting the combustion unit 103 (Step S702).

With this, the combustion fan 18 is activated, so that the combustion air flows through the combustion air supply passage 76 to be supplied to the second combustor 17. Next, the ignition unit (not shown in FIG. 6) of the second combustor 17 is activated. Next, the second combustible gas supply unit 22 is activated, so that the combustion fuel is supplied to the second combustor 17. Thus, the ignition operation of the second combustor 17 is performed.

Then, during the period of the ignition operation of the second combustor 17, a command for increasing the electric power generation amount of the fuel cell unit 101 is input to the controller 102 (Step S703). Then, the controller 102 outputs a command for increasing the manipulation amounts of the first combustible gas supply unit 20 (or the material gas supply unit 21), the oxidizing gas supply unit 15, and the combustion fan 14c and a command for decreasing the manipulation amount of the ventilation fan 13 (Step S704).

At this time, the controller 102 controls increased amounts of the manipulation amounts of the first combustible gas supply unit 20 (or the material gas supply unit 21), the oxidizing gas supply unit 15, and the combustion fan 14c and a decreased amount of the manipulation amount of the ventilation fan 13 such that the flow rate of the exhaust gas discharged from the fuel cell unit 101 becomes constant.

When the ignition detection of the second combustor 17 is input to the controller 102 by the ignition detector (not shown in FIG. 6) of the second combustor 17 (Yes in Step S705), the controller 102 outputs a command for increasing the manipulation amount to the ventilation fan 13 (Step S706). With this, the inside of the case 12 can be adequately ventilated.

(2) In Case Where Command for Decreasing Electric Power Generation Amount of Fuel Cell Unit 101 is Input to Controller 102 During Period of Ignition Operation of Second Combustor 17

Figure 10:
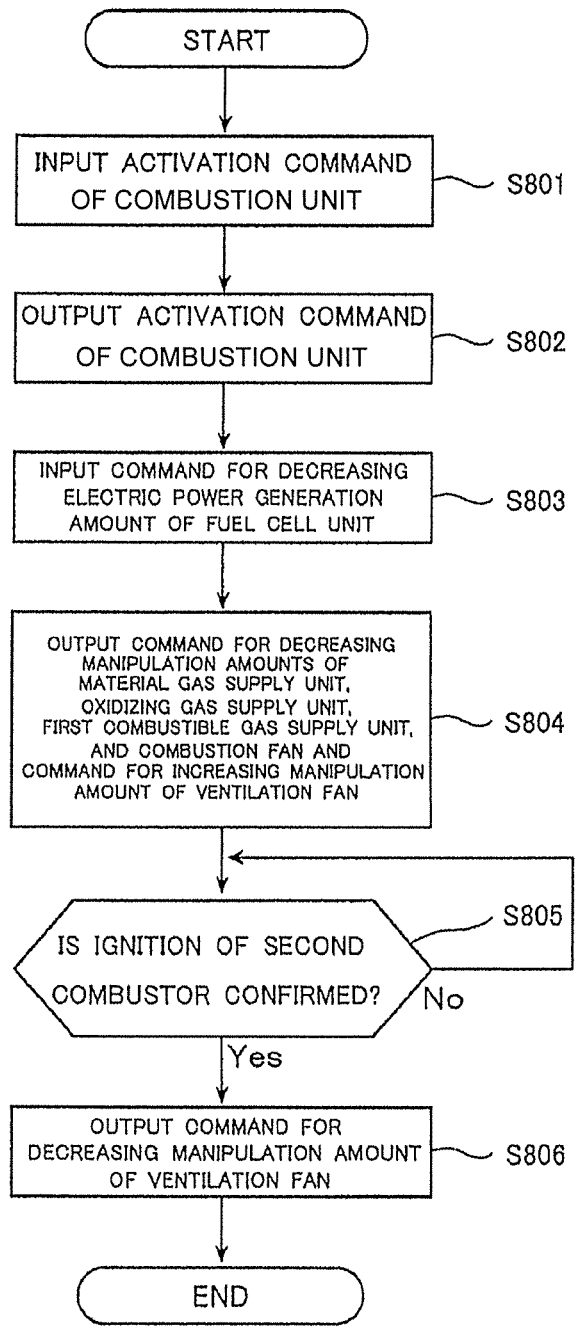
FIG. 10 is a flow chart showing one example of the operation of the power generation system according to Embodiment 3.

FIG. 10 is a flow chart showing one example of the operation of the power generation system according to Embodiment 3.

As shown in FIG. 10, first, in a case where the activating command of the combustion unit 103 is input to the controller 102 during the operation of the fuel cell unit 101 (Step S801), the controller 102 outputs the activation start command of the combustion unit 103 to respective devices constituting the combustion unit 103 (Step S802).

With this, the combustion fan 18 is activated, so that the combustion air flows through the combustion air supply passage 76 to be supplied to the second combustor 17. Next, the ignition unit (not shown in FIG. 6) of the second combustor 17 is activated. Next, the second combustible gas supply unit 22 is activated, so that the combustion fuel is supplied to the second combustor 17. Thus, the ignition operation of the second combustor 17 is performed.

Then, during the period of the ignition operation of the second combustor 17, a command for decreasing the electric power generation amount of the fuel cell unit 101 is input to the controller 102 (Step S803). Then, the controller 102 outputs a command for decreasing the manipulation amounts of the material gas supply unit 21, the oxidizing gas supply unit 15, the first combustible gas supply unit 20, and the combustion fan 14c and a command for increasing the manipulation amount of the ventilation fan 13 (Step S804).

As this time, the controller 102 controls decreased amounts of the manipulation amounts of the first combustible gas supply unit 20 (or the material gas supply unit 21), the oxidizing gas supply unit 15, and the combustion fan 14c and an increased amount of the manipulation amount of the ventilation fan 13 such that the flow rate of the exhaust gas discharged from the fuel cell unit 101 becomes constant.

When the ignition detection of the second combustor 17 is input to the controller 102 by the ignition detector (not shown in FIG. 6) of the second combustor 17 (Yes in Step S805), the controller 102 outputs a command for decreasing the manipulation amount to the ventilation fan 13 (Step S806). With this, unnecessary consumption of electric power can be suppressed.

In the power generation system 100 according to Embodiment 3 configured as above, in a case where the electric power generation amount of the fuel cell unit 101 is changed during the period of the ignition operation of the second combustor 17, the flow rate of the exhaust gas discharged from the fuel cell unit 101 is caused to become constant, so that the ignition operation of the second combustor 17 can be stably performed.

Embodiment 4

The power generation system according to Embodiment 4 of the present invention is configured such that: the combustion unit includes a second combustible gas supply unit configured to supply the combustible gas to the second combustor, and a second air supply unit configured to supply air to the second combustor; in a case where the controller increases a combustion amount of the combustion unit during the period of the ignition operation of the first combustor, the controller increases a manipulation amount of the second combustible gas supply unit and decreases the manipulation amount of the second air supply unit; and in a case where the controller decreases the combustion amount of the combustion unit during the period of the ignition operation of the first combustor, the controller decreases the manipulation amount of the second combustible gas supply unit and increases the manipulation amount of the second air supply unit.

The manipulation amount of the second combustible gas supply unit is increased and the manipulation amount of the second air supply unit is decreased within such a range that the combustion failure does not occur in the second combustor of the combustion unit or the carbon monoxide is not generated in the second combustor of the combustion unit. The manipulation amount of the second combustible gas supply unit is decreased and the manipulation amount of the second air supply unit is increased within such a range that the combustion failure does not occur in the second combustor of the combustion unit or the carbon monoxide is not generated in the second combustor of the combustion unit.

Hereinafter, one example of the power generation system according to Embodiment 4 will be specifically explained. Since the configuration of the power generation system according to Embodiment 4 is the same as each of the configurations of the power generation systems according to Embodiments 1 and 2, a detailed explanation thereof is omitted.

Operations of Power Generation System

In a case where the controller 102 changes the combustion amount of the combustion unit 103 during the period of the ignition operation of the first combustor 14b, the controller 102 changes the manipulation amounts of the second combustible gas supply unit 22 and the combustion fan 18 to cause the flow rate of the exhaust gas discharged from the combustion unit 103 to become constant. Hereinafter, the control of the fuel cell unit 101 and the combustion unit 103 by the controller 102 will be specifically explained in reference to FIGS. 11 and 12.

Figure 11:
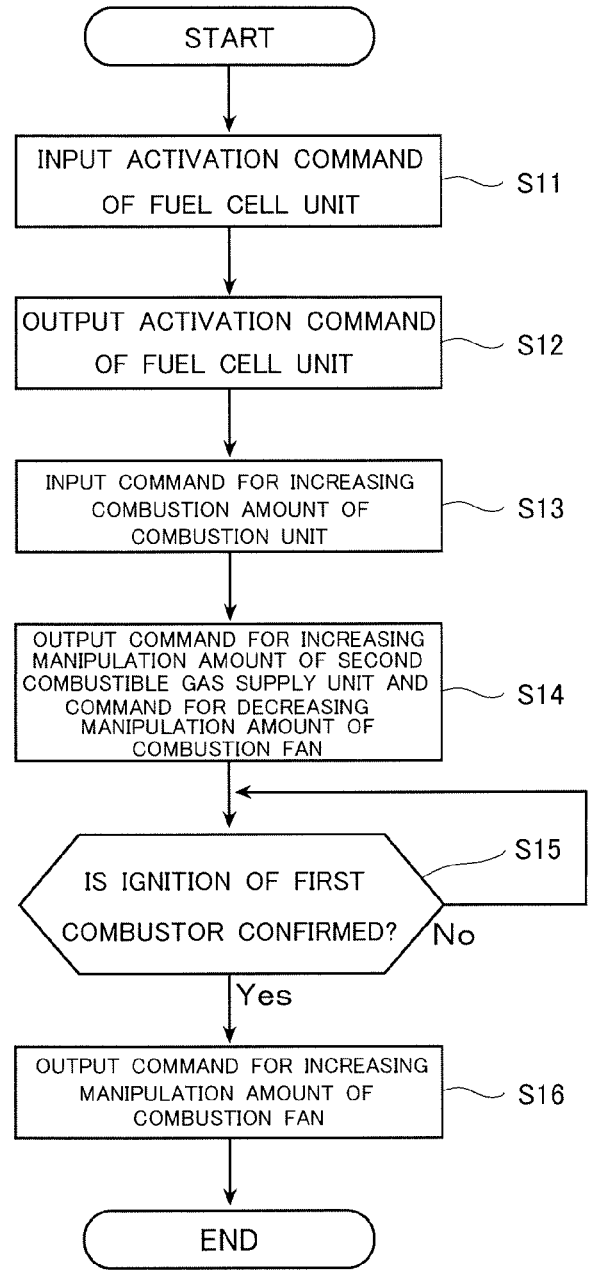
FIG. 11 is a flow chart showing one example of the operation of the power generation system according to Embodiment 4.

(1) In Case where Command for Increasing Combustion Amount of Second Combustor 17 is Input to Controller 102 During Period of Ignition Operation of First Combustor 14b FIG. 11 is a flow chart showing one example of the operation of the power generation system according to Embodiment 4.

As shown in FIG. 11, first, when the activating command of the fuel cell unit 101 is input to the controller 102 during the operation of the combustion unit 103 (Step S11), the controller 102 outputs the activation start command of the fuel cell unit 101 to respective devices constituting the fuel cell unit 101 (Step S12).

With this, the operation of the fuel cell unit 101 is started. Specifically, first, the combustion fan 14c is activated, so that the combustion air flows through the air supply passage 79 to be supplied to the first combustor 14b. Next, the ignition unit (not shown in FIGS. 1 and 6) of the first combustor 14b is activated. Then, the first combustible gas supply unit 20 is activated, so that the combustible gas (combustion fuel) is supplied to the first combustor 14b. Thus, the ignition operation of the first combustor 14b is performed.

Then, during the period of the ignition operation of the first combustor 14b, a command for increasing the combustion amount of the combustion unit 103 (second combustor 17) is input to the controller 102 (Step S13). Then, the controller 102 outputs a command for increasing the manipulation amount of the second combustible gas supply unit 22 and a command for decreasing the manipulation amount of the combustion fan 18 (Step S14).

At this time, the controller 102 controls an increased amount of the manipulation amount of the second combustible gas supply unit 22 and a decreased amount of the manipulation amount of the combustion fan 18 such that the flow rate of the exhaust gas discharged from the combustion unit 103 becomes constant. The controller 102 controls the second combustible gas supply unit 22 and the combustion fan 18 such that the manipulation amount of the second combustible gas supply unit 22 is increased and the manipulation amount of the combustion fan 18 is decreased within such a range that the combustion failure does not occur in the second combustor 17 or the carbon monoxide is not generated in the second combustor 17 (an air-fuel ratio falls within such a range that the combustion in the second combustor 17 can be continued).

Next, when the ignition detection of the first combustor 14b is input to the controller 102 by the ignition detector (not shown in FIGS. 1 and 6) of the first combustor 14b (Yes in Step S15), the controller 102 outputs the command for increasing the manipulation amount to the combustion fan 18 (Step S16). With this, the combustion in the second combustor 17 can be more stably performed.

In the fuel cell unit 101, after the ignition of the first combustor 14b, respective operations are performed, that is, for example, the hydrogen generator 14 generates the fuel gas to supply the fuel gas to the fuel gas channel 11A. Since these operations are the same as the electric power generating operations of a typical fuel cell, detailed explanations thereof are omitted.

Herein, the controller 102 increases the manipulation amount of the combustion fan 18 in Step S16. However, the present embodiment is not limited to this. The controller 102 may decrease the manipulation amount of the second combustible gas supply unit 22 in Step S16.

Figure 12:
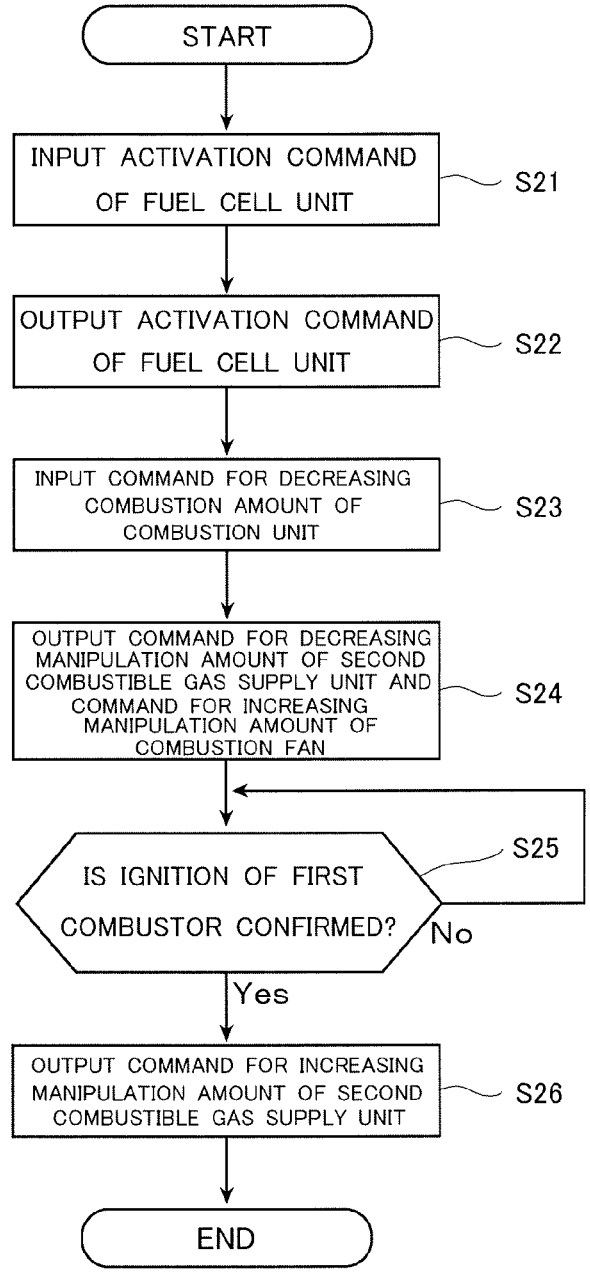
FIG. 12 is a flow chart showing one example of the operation of the power generation system according to Embodiment 4.

(2) In Case where Command for Decreasing Combustion Amount of Combustion Unit 103 is Input to Controller 102 During Period of Ignition Operation of First Combustor 14b FIG. 12 is a flow chart showing one example of the operation of the power generation system according to Embodiment 4.

As shown in FIG. 12, first, when the activating command of the fuel cell unit 101 is input to the controller 102 during the operation of the combustion unit 103 (Step S21), the controller 102 outputs the activation start command of the fuel cell unit 101 to respective devices constituting the fuel cell unit 101 (Step S22).

With this, the operation of the fuel cell unit 101 is started. Specifically, first, the combustion fan 14c is activated, so that the combustion air flows through the air supply passage 79 to be supplied to the first combustor 14b. Next, the ignition unit (not shown in FIGS. 1 and 6) of the first combustor 14b is activated. Then, the first combustible gas supply unit 20 is activated, so that the combustible gas (combustion fuel) is supplied to the first combustor 14b. Thus, the ignition operation of the first combustor 14b is performed.

Then, during the period of the ignition operation of the first combustor 14b, a command for decreasing the combustion amount of the combustion unit 103 (second combustor 17) is input to the controller 102 (Step S23). Then, the controller 102 outputs a command for decreasing the manipulation amount of the second combustible gas supply unit 22 and a command for increasing the manipulation amount of the combustion fan 18 (Step S24).

At this time, the controller 102 controls a decreased amount of the manipulation amount of the second combustible gas supply unit 22 and an increased amount of the manipulation amount of the combustion fan 18 such that the flow rate of the exhaust gas discharged from the combustion unit 103 becomes constant. The controller 102 controls the second combustible gas supply unit 22 and the combustion fan 18 such that the manipulation amount of the second combustible gas supply unit 22 is decreased and the manipulation amount of the combustion fan 18 is increased within such a range that the combustion failure does not occur in the second combustor 17 or the carbon monoxide is not generated in the second combustor 17 (the air-fuel ratio falls within such a range that the combustion in the second combustor 17 can be continued).

Next, when the ignition detection of the first combustor 14b is input to the controller 102 by the ignition detector (not shown in FIGS. 1 and 6) of the first combustor 14b (Yes in Step S25), the controller 102 outputs a command for increasing the manipulation amount to the second combustible gas supply unit 22 (Step S26). With this, the combustion in the second combustor 17 can be more stably performed.

In the fuel cell unit 101, after the ignition of the first combustor 14b, respective operations are performed, that is, for example, the hydrogen generator 14 generates the fuel gas to supply the fuel gas to the fuel gas channel 11A. Since these operations are the same as the electric power generating operations of a typical fuel cell, detailed explanations thereof are omitted.

Herein, the controller 102 increases the manipulation amount of the second combustible gas supply unit 22 in Step S26. However, the present embodiment is not limited to this. The controller 102 may decrease the manipulation amount of the combustion fan 18 in Step S26.

In the power generation system 100 according to Embodiment 4 configured as above, in a case where the combustion amount of the combustion unit 103 is changed during the period of the ignition operation of the first combustor 14b, the flow rate of the exhaust gas discharged from the combustion unit 103 is caused to become constant, so that the ignition operation of the first combustor 14b can be stably performed.

Embodiment 5

The power generation system according to Embodiment 5 of the present invention is configured such that: the fuel cell unit includes a first combustible gas supply unit configured to supply the combustible gas to the first combustor, and a first air supply unit configured to supply air to the first combustor; the combustion unit includes a second combustible gas supply unit configured to supply the combustible gas to the second combustor, and a second air supply unit configured to supply the air to the second combustor; the controller prestores a first threshold that is an air-fuel ratio higher than one and equal to or lower than two; and in a case where the air-fuel ratio of the other combustor is equal to or higher than the first threshold, and the controller causes the one combustor to perform the ignition operation, and if a command for increasing a manipulation amount of the other combustor is input to the controller, the controller causes the flow rate of the exhaust gas discharged from the other combustor to become constant by increasing the manipulation amount of the combustible gas supply unit configured to supply the combustible gas to the other combustor and decreasing the manipulation amount of the air supply unit configured to supply the air to the other combustor.

Herein, the air-fuel ratio is a ratio of the air to the combustible gas and is determined based on the combustion reaction. The air-fuel ratio is one when the combustible gas completely combusts together with oxygen in the air in just proportion. For example, when the air-fuel ratio is 1.5, the amount of air supplied is 1.5 times the amount of air necessary when the combustible gas completely combusts. A first threshold is set to be higher than a lower limit of the air-fuel ratio by a predetermined amount.

The power generation system according to Embodiment 5 may be configured such that: the fuel cell unit includes a first combustible gas supply unit configured to supply the combustible gas to the first combustor, and a first air supply unit configured to supply air to the first combustor; the combustion unit includes a second combustible gas supply unit configured to supply the combustible gas to the second combustor, and a second air supply unit configured to supply the air to the second combustor; the controller prestores a first threshold that is an air-fuel ratio higher than one and equal to or lower than two; and in a case where the air-fuel ratio of the other combustor is lower than the first threshold, and the controller causes the one combustor to perform the ignition operation, and if a command for increasing a manipulation amount of the other combustor is input to the controller, the controller causes the one combustor to perform the ignition operation, and then increases a combustion amount of the other combustor.

Hereinafter, one example of the power generation system according to Embodiment 5 will be specifically explained. Since the configuration of the power generation system according to Embodiment 5 is the same as each of the configurations of the power generation systems according to Embodiments 1 and 2, a detailed explanation thereof is omitted.

Operations of Power Generation System

Figure 13:
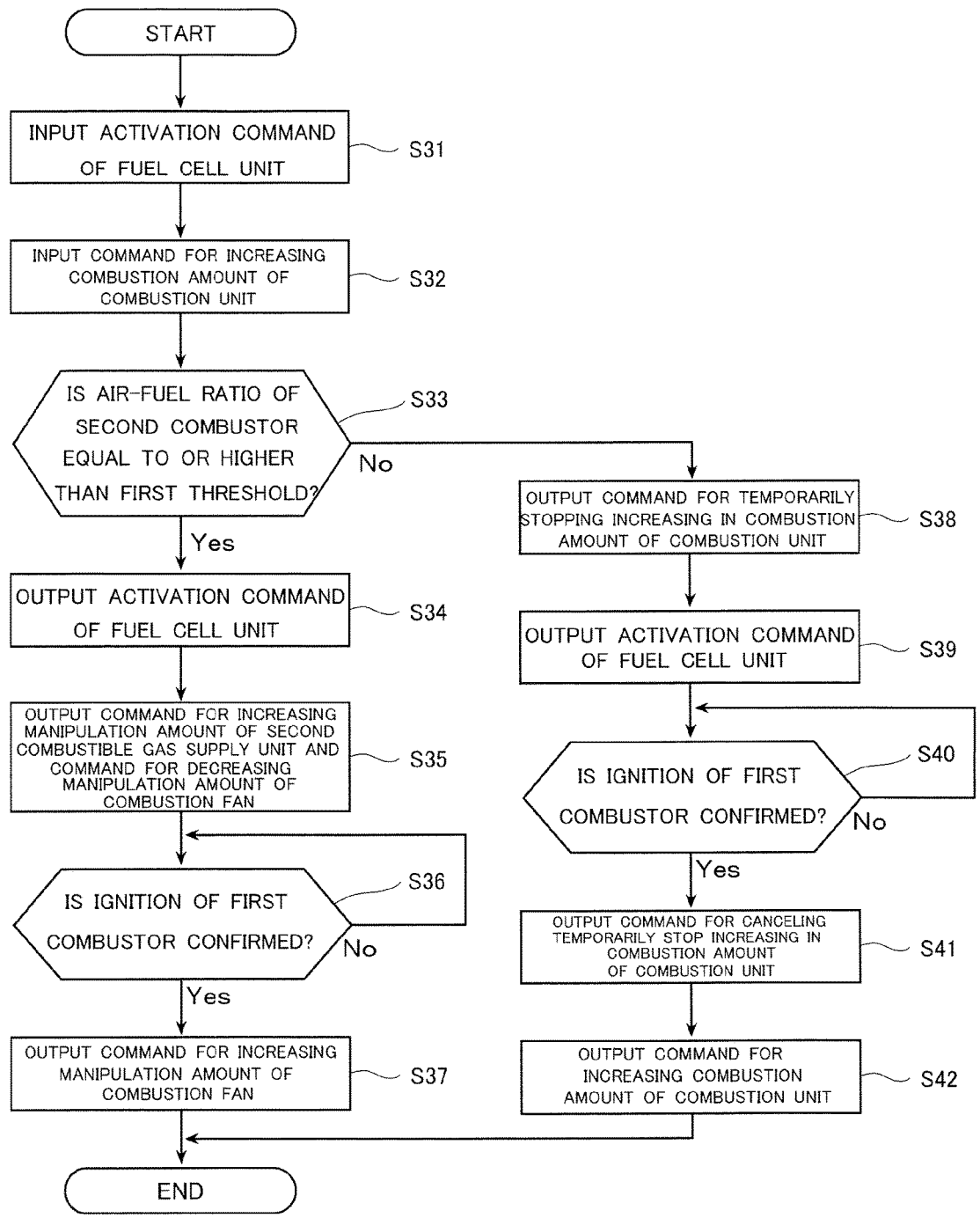
FIG. 13 is a flow chart showing one example of the operation of the power generation system according to Embodiment 5.

FIG. 13 is a flow chart showing one example of the operation of the power generation system according to Embodiment 5.

As shown in FIG. 13, first, the activating command of the fuel cell unit 101 is input to the controller 102 during the operation of the combustion unit 103 (Step S31), and the command for increasing the combustion amount of the combustion unit 103 (the combustion amount of the second combustor 17) is input to the controller 102 (Step S32).

The controller 102 confirms whether or not the air-fuel ratio of the second combustor 17 is equal to or higher than the first threshold (Step S33). When the air-fuel ratio of the second combustor 17 is equal to or higher than the first threshold (Yes in Step S33), the controller 102 proceeds to Step S34. When the air-fuel ratio of the second combustor 17 is lower than the first threshold (No in Step S33), the controller 102 proceeds to Step S38.

In Step S34, the controller 102 outputs the activating command of the fuel cell unit 101. With this, the combustion fan 14c is activated, so that the combustion air flows through the air supply passage 79 to be supplied to the first combustor 14b. Next, the ignition unit (not shown in FIGS. 1 and 6) of the first combustor 14b is activated. Then, the first combustible gas supply unit 20 is activated, so that the combustible gas (combustion fuel) is supplied to the first combustor 14b. Thus, the ignition operation of the first combustor 14b is performed.

Next, the controller 102 outputs the command for increasing the manipulation amount of the second combustible gas supply unit 22 and the command for decreasing the manipulation amount of the combustion fan 18 (Step S35). This is because when the air-fuel ratio of the second combustor 17 is equal to or higher than the first threshold, the air is being adequately supplied to the second combustor 17, so that the manipulation amount of the combustion fan 18 can be decreased. Specifically, the controller 102 increases the manipulation amount of the second combustible gas supply unit 22 and decreases the manipulation amount of the combustion fan 18 such that the air-fuel ratio of the second combustor 17 becomes equal to or higher than one, preferably, equal to or higher than the first threshold. With this, the flow rate of the exhaust gas discharged from the combustion unit 103 can be caused to become constant.

When the ignition detection of the first combustor 14b is input to the controller 102 by the ignition detector (not shown in FIGS. 1 and 6) of the first combustor 14b (Yes in Step S36), the controller outputs the command for increasing the manipulation amount to the combustion fan 18 (Step S37). With this, the combustion in the second combustor 17 can be more stably performed.

In Step S38, the controller 102 temporarily stops the increase in the combustion amount of the combustion unit 103. This is because when the air-fuel ratio of the second combustor 17 is lower than the first threshold, the amount of remaining air unconsumed in the combustion in the second combustor 17 is small, so that it is not easy to decrease the manipulation amount of the combustion fan 18.

Next, the controller 102 outputs the activation start command of the fuel cell unit 101 to respective devices constituting the fuel cell unit 101 (Step S39).

With this, the operation of the fuel cell unit 101 is started. Specifically, first, the combustion fan 14c is activated, so that the combustion air flows through the air supply passage 79 to be supplied to the first combustor 14b. Next, the ignition unit (not shown in FIGS. 1 and 6) of the first combustor 14b is activated. Then, the first combustible gas supply unit 20 is activated, so that the combustible gas (combustion fuel) is supplied to the first combustor 14b. When the combustible gas is supplied to the first combustor 14b, the first combustor 14b ignites the combustible gas and the combustion air to combust the fuel-air mixture of the combustible gas and the combustion air.

When the ignition detection of the first combustor 14b is input to the controller 102 by the ignition detector (not shown in FIGS. 1 and 6) of the first combustor 14b (Yes in Step S40), the controller 102 cancels the temporary stop of the increase in the combustion amount of the combustion unit 103 (Step S41). Next, the controller 102 outputs the command for increasing the combustion amount of the combustion unit 103 to respective devices constituting the combustion unit 103 (Step S42).

In a case where the air-fuel ratio of the second combustor 17 is lower than the first threshold, the change in the combustion amount of the second combustor 17 is temporarily stopped when the first combustor 14b performs the ignition operation. With this, the operating state of the second combustor 17 is maintained, and the flow rate of the exhaust gas discharged from the combustion unit 103 to the discharge passage 70 can be caused to become constant. On this account, the ignition operation of the first combustor 14b can be stably performed.

The same operations as above are performed in a case where the activating command of the combustion unit 103 is input to the controller 102, and the command for increasing the electric power generation amount of the fuel cell unit 101 (the combustion amount of the first combustor 14b) is input to the controller 102.

The power generation system 100 according to Embodiment 5 configured as above can stably perform the ignition operation of the first combustor 14b or the second combustor 17.

Embodiment 6

The power generation system according to Embodiment 6 of the present invention is configured such that: the fuel cell unit includes a first combustible gas supply unit configured to supply the combustible gas to the first combustor, and a first air supply unit configured to supply air to the first combustor; the combustion unit includes a second combustible gas supply unit configured to supply the combustible gas to the second combustor, and a second air supply unit configured to supply the air to the second combustor; the controller prestores a second threshold that is an air-fuel ratio within such a range that combustion in the other combustor is continued and is an air-fuel ratio higher than two; and in a case where the air-fuel ratio of the other combustor is the second threshold, and the controller causes the one combustor to perform the ignition operation, and if a command for decreasing a combustion amount of the other combustor is input to the controller, the controller causes the air-fuel ratio of the other combustor to become higher than one and equal to or lower than the second threshold by decreasing a manipulation amount of the combustible gas supply unit configured to supply the combustible gas to the other combustor and increasing the manipulation amount of the air supply unit configured to supply the air to the other combustor.

The power generation system according to Embodiment 6 may be configured such that: the fuel cell unit includes a first combustible gas supply unit configured to supply the combustible gas to the first combustor, and a first air supply unit configured to supply air to the first combustor; the combustion unit includes a second combustible gas supply unit configured to supply the combustible gas to the second combustor, and a second air supply unit configured to supply the air to the second combustor; the controller prestores a second threshold that is an air-fuel ratio within such a range that combustion in the other combustor is continued and is an air-fuel ratio higher than two; and in a case where the air-fuel ratio of the other combustor is higher than the second threshold, and the controller causes the one combustor to perform the ignition operation, and if a command for decreasing a manipulation amount of the other combustor is input to the controller, the controller causes the one combustor to perform the ignition operation, and then decreases a combustion amount of the other combustor.

Herein, the second threshold of the air-fuel ratio may be higher than two and equal to or lower than three. In addition, the second threshold is set to be lower than an upper limit of the air-fuel ratio by a predetermined amount.

Hereinafter, one example of the power generation system according to Embodiment 6 will be specifically explained. Since the configuration of the power generation system according to Embodiment 6 is the same as each of the configurations of the power generation systems according to Embodiments 1 and 2, a detailed explanation thereof is omitted.

Operations of Power Generation System

Figure 14:
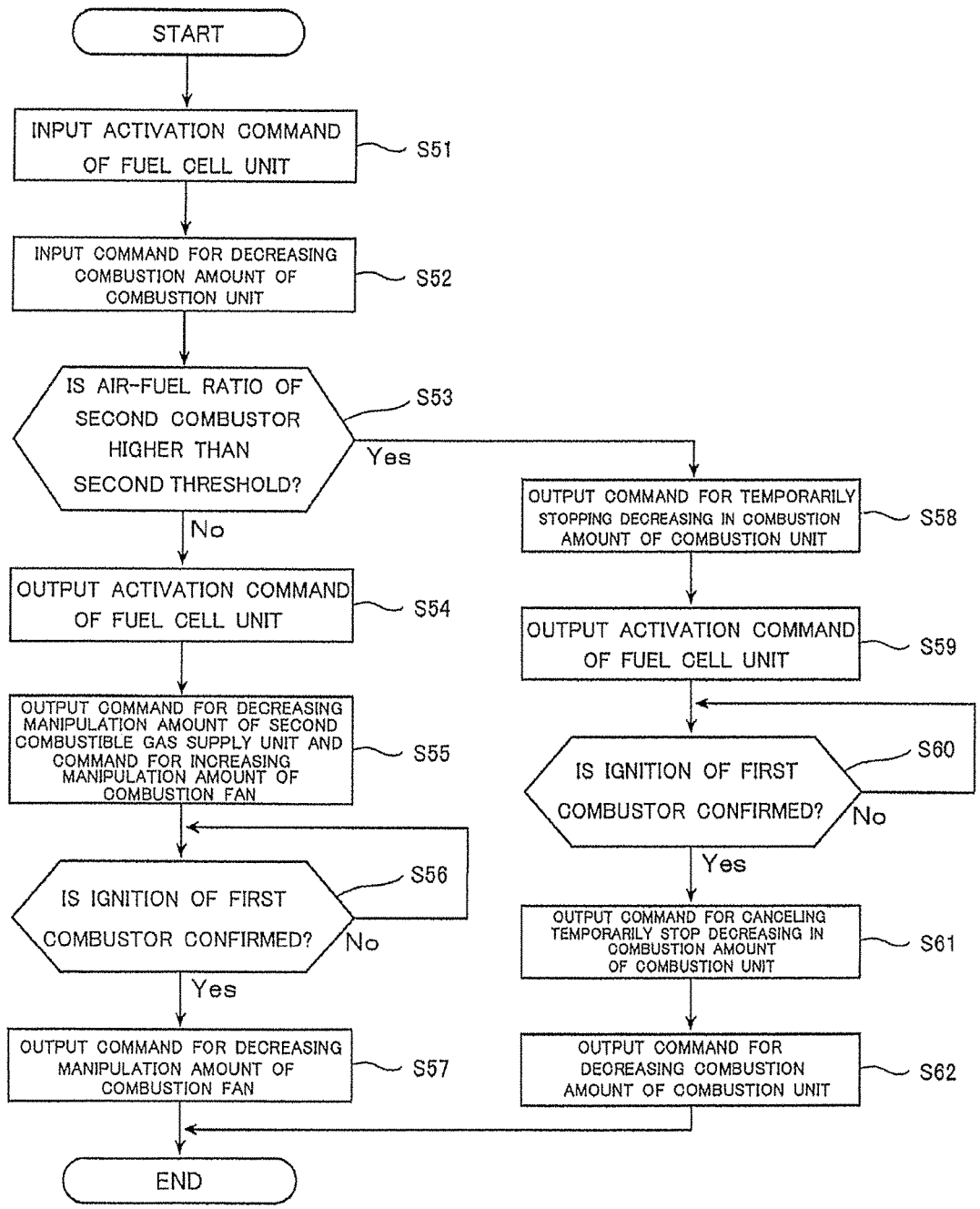
FIG. 14 is a flow chart showing one example of the operation of the power generation system according to Embodiment 6.

FIG. 14 is a flow chart showing one example of the operation of the power generation system according to Embodiment 6.

As shown in FIG. 14, first, the activating command of the fuel cell unit 101 is input to the controller 102 during the operation of the combustion unit 103 (Step S51), and the command for decreasing the combustion amount of the combustion unit 103 (the combustion amount of the second combustor 17) is input to the controller 102 (Step S52).

The controller 102 confirms whether or not the air-fuel ratio of the second combustor 17 is higher than the second threshold (Step S53). When the air-fuel ratio of the second combustor 17 is equal to or lower than the second threshold (No in Step S53), the controller 102 proceeds to Step S54. When the air-fuel ratio of the second combustor 17 is higher than the second threshold (Yes in Step S53), the controller 102 proceeds to Step S58.

In Step S54, the controller 102 outputs the activating command of the fuel cell unit 101. With this, the combustion fan 14c is activated, so that the combustion air flows through the air supply passage 79 to be supplied to the first combustor 14b. Next, the ignition unit (not shown in FIGS. 1 and 6) of the first combustor 14b is activated. Then, the material gas supply unit 21 is activated, so that the material gas (combustion fuel) is supplied to the first combustor 14b. Thus, the ignition operation of the first combustor 14b is performed.

Next, the controller 102 outputs the command for decreasing the manipulation amount of the second combustible gas supply unit 22 and the command for increasing the manipulation amount of the combustion fan 18 (Step S55). This is because when the air-fuel ratio of the second combustor 17 is equal to or lower than the second threshold, the manipulation amount of the second combustible gas supply unit 22 can be decreased and the manipulation amount of the combustion fan 18 can be increased within such a range that the combustion in the second combustor 17 can be continued. Specifically, the controller 102 decreases the manipulation amount of the second combustible gas supply unit 22 and increases the manipulation amount of the combustion fan 18 such that, for example, the air-fuel ratio of the second combustor 17 becomes higher than two and equal to or lower than three (the air-fuel ratio of the second combustor 17 becomes higher than one and equal to or lower than the second threshold). With this, the flow rate of the exhaust gas discharged from the combustion unit 103 can be caused to become constant.

When the ignition detection of the first combustor 14b is input to the controller 102 by the ignition detector (not shown in FIGS. 1 and 6) of the first combustor 14b (Yes in Step S56), the controller outputs the command for decreasing the manipulation amount to the combustion fan 18 (Step S57). With this, the combustion in the second combustor 17 can be more stably performed.

In Step S58, the controller 102 temporarily stops the decrease in the combustion amount of the combustion unit 103. With this, when the air-fuel ratio of the second combustor 17 is higher than the second threshold, a case where the combustion in the second combustor 17 cannot be continued can be avoided by changing the manipulation amounts of the second combustible gas supply unit 22 and the combustion fan 18.

Next, the controller 102 outputs the activation start command of the fuel cell unit 101 to respective devices constituting the fuel cell unit 101 (Step S59). With this, the operation of the fuel cell unit 101 is started. Specifically, first, the combustion fan 14c is activated, so that the combustion air flows through the air supply passage 79 to be supplied to the first combustor 14b. Next, the ignition unit (not shown in FIGS. 1 and 6) of the first combustor 14b is activated. Then, the first combustible gas supply unit 20 is activated, so that the combustible gas (combustion fuel) is supplied to the first combustor 14b. When the combustible gas is supplied to the first combustor 14b, the first combustor 14b ignites the combustible gas and the combustion air to combust the fuel-air mixture of the combustible gas and the combustion air.

When the ignition detection of the first combustor 14b is input to the controller 102 by the ignition detector (not shown in FIGS. 1 and 6) of the first combustor 14b (Yes in Step S60), the controller 102 cancels the temporary stop of the decrease in the combustion amount of the combustion unit 103 (Step S61). Next, the controller 102 outputs the command for decreasing the combustion amount of the combustion unit 103 to respective devices (the first combustible gas supply unit 20 and the combustion fan 18) constituting the combustion unit 103 (Step S42).

With this, in a case where the air-fuel ratio of the second combustor 17 is higher than the second threshold, the change in the combustion amount of the second combustor 17 is temporarily stopped when the first combustor 14b performs the ignition operation. With this, the operating state of the second combustor 17 is maintained, and the flow rate of the exhaust gas discharged from the combustion unit 103 to the discharge passage 70 can be caused to become constant. On this account, the ignition operation of the first combustor 14b can be stably performed.

The same operations as above are performed in a case where the activating command of the combustion unit 103 is input to the controller 102, and the command for decreasing the electric power generation amount of the fuel cell unit 101 (the combustion amount of the first combustor 14b) is input to the controller 102.

The power generation system 100 according to Embodiment 6 configured as above can stably perform the ignition operation of the first combustor 14b or the second combustor 17.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

According to the power generation system of the present invention and the method of operating the power generation system, in the power generation system including the exhaust passage configured to cause the fuel cell unit and the combustion unit to communicate with each other, the ignition operation of one of the combustors can be stably performed even in a case where a command for changing the operating state of the unit including the other combustor is output. Therefore, the power generation system of the present invention and the method of operating the power generation system are useful.

REFERENCE SIGNS LIST 11 fuel cell
11A fuel gas channel
11B oxidizing gas channel
12 case 13 ventilation fan
14 hydrogen generator
14a reformer
14b first combustor
14c combustion fan
15 oxidizing gas supply unit
16 air supply port
17 second combustor
18 combustion fan
19 air supply port
70 discharge passage
71 fuel gas supply passage
72 oxidizing gas supply passage
73 off fuel gas passage
74 off oxidizing gas passage
75 ventilation passage
76 combustion air supply passage
77 exhaust gas passage
79 air supply passage
80 flue gas passage
100 power generation system
101 fuel cell unit
102 controller
103 combustion unit
103A exhaust port
200 building

The invention claimed is:

1. A power generation system comprising:
a fuel cell unit including:
   a fuel cell configured to generate electric power using a fuel gas and an oxidizing gas, a hydrogen generator including a first combustor and configured to generate the fuel gas supplied to the fuel cell, and
   a case which houses at least the fuel cell and the hydrogen generator;
a combustion unit arranged outside the case and including a second combustor configured to combust a combustible gas, the combustion unit and the fuel cell unit are separate units;
a controller, wherein the controller individually controls the fuel cell unit and the combustion unit; and
a discharge passage which is formed to cause the fuel cell unit and the combustion unit to communicate with each other and through which an exhaust gas discharged from the first combustor of the fuel cell unit and an exhaust gas discharged from the combustion unit are discharged to an atmosphere from a downstream end of the discharge passage which end is open to the atmosphere, the discharge passage including:
   a first passage which includes an upstream end connected to the fuel cell unit and through which the exhaust gas discharged from the first combustor of the fuel cell unit flows,
   a second passage which includes an upstream end connected to the combustion unit and through which the exhaust gas discharged from the combustion unit flows,
   a merging portion where the first passage and the second passage merge, and
   a common passage which extends from the merging portion to the downstream end of the discharge passage,
wherein the fuel cell unit includes a ventilator configured to operate when the fuel cell performs an electric power generating operation, and to ventilate an inside of the fuel cell unit by discharging a gas in the fuel cell unit to the discharge passage;
the discharge passage is configured such that at least a gas in the case is discharged to the atmosphere; and
when the controller causes the second combustor to perform an ignition operation, the controller maintains an operating state of the first combustor and an operating state of the ventilator during a period of the ignition operation of the second combustor.

2. The power generation system according to claim 1, wherein when the controller causes the second combustor to perform the ignition operation, the controller causes a flow rate of the exhaust gas discharged from the first combustor of the fuel cell unit and a flow rate of the gas in the fuel cell unit discharged by an operation of the ventilator to become constant during the period of the ignition operation of the second combustor.

3. The power generation system according to claim 1, wherein when the controller causes the second combustor to perform the ignition operation, and if an ignition operation command of the first combustor is input to the controller, the controller does not cause the first combustor to perform the ignition operation during the period of the ignition operation of the second combustor.

4. The power generation system according to claim 1, wherein when the controller causes the second combustor to perform the ignition operation, and if an ignition operation command of the first combustor is input to the controller, the controller causes the second combustor to perform the ignition operation, and then causes the first combustor to perform the ignition operation.

5. The power generation system according to claim 1, wherein when the controller causes the second combustor to perform the ignition operation, and if a command for changing a flow rate of the exhaust gas discharged from the first combustor is input to the controller, the controller causes the second combustor to perform the ignition operation, and then changes the flow rate of the exhaust gas discharged from the first combustor.

6. The power generation system according to claim 1, wherein when the controller causes the second combustor to perform the ignition operation, the controller controls the fuel cell unit so as not to change an electric power generation amount of the fuel cell during the period of the ignition operation of the second combustor.

7. The power generation system according to claim 1, wherein:
the fuel cell unit includes:
   an oxidizing gas supply unit configured to supply the oxidizing gas to a cathode of the fuel cell,
   a first air supply unit configured to supply air to the first combustor, and
   a first combustible gas supply unit configured to supply the combustible gas to the first combustor;
the discharge passage is configured such that a gas in the case, an off oxidizing gas discharged from the cathode, and an off combustion gas discharged from the first combustor are discharged to the atmosphere; and
when the controller changes an electric power generation amount of the fuel cell unit during the period of the ignition operation of the second combustor, the controller changes manipulation amounts of the ventilator, the oxidizing gas supply unit, the first air supply unit, and the first combustible gas supply unit to cause the flow rate of the exhaust gas discharged from the fuel cell unit to become constant.

8. The power generation system according to claim 7, wherein:
when the controller increases the electric power generation amount of the fuel cell unit during the period of the ignition operation of the second combustor, the controller increases the manipulation amounts of the oxidizing gas supply unit, the first air supply unit, and the first combustible gas supply unit and decreases the manipulation amount of the ventilator; and
when the controller decreases the electric power generation amount of the fuel cell unit during the period of the ignition operation of the second combustor, the controller decreases the manipulation amounts of the oxidizing gas supply unit, the first air supply unit, and the first combustible gas supply unit and increases the manipulation amount of the ventilator.

9. A power generation system comprising: a fuel cell unit including:
a fuel cell configured to generate electric power using a fuel gas and an oxidizing gas, a hydrogen generator including a first combustor and configured to generate the fuel gas supplied to the fuel cell, and
a case which houses at least the fuel cell and the hydrogen generator;
a combustion unit arranged outside the case and including a second combustor configured to combust a combustible gas, the combustion unit and the fuel cell unit are separate units;
a controller, wherein the controller individually controls the fuel cell unit and the combustion unit; and
a discharge passage which is formed to cause the fuel cell unit and the combustion unit to communicate with each other and through which an exhaust gas discharged from the first combustor of the fuel cell unit and an exhaust gas discharged from the combustion unit are discharged to an atmosphere from a downstream end of the discharge passage which end is open to the atmosphere, the discharge passage including:
a first passage which includes an upstream end connected to the fuel cell unit and through which the exhaust gas discharged from the first combustor of the fuel cell unit flows,
a second passage which includes an upstream end connected to the combustion unit and through which the exhaust gas discharged from the combustion unit flows,
a merging portion where the first passage and the second passage merge, and
a common passage which extends from the merging portion to the downstream end of the discharge passage, wherein:
the fuel cell unit includes a ventilator configured to operate when the fuel cell performs an electric power generating operation, and to ventilate an inside of the fuel cell unit by discharging a gas in the fuel cell unit to the discharge passage;
the discharge passage is configured such that at least a gas in the case is discharged to the atmosphere; and
when the controller causes the first combustor to perform the ignition operation, the controller controls the combustion unit so as not to change a combustion amount of the second combustor during the period of the ignition operation of the first combustor and also controls the ventilator so as not to change a manipulation amount of the ventilator during the period of the ignition operation of the first combustor.

10. The power generation system according to claim 1, wherein:
the fuel cell unit includes:
a first combustible gas supply unit configured to supply the combustible gas to the first combustor, and
a first air supply unit configured to supply air to the first combustor;
the combustion unit includes:
a second combustible gas supply unit configured to supply the combustible gas to the second combustor, and
a second air supply unit configured to supply the air to the second combustor;
the controller prestores a first threshold that is an air-fuel ratio higher than one and equal to or lower than two; and
when the air-fuel ratio of the first combustor is equal to or higher than the first threshold, and the controller causes the second combustor to perform the ignition operation, and if a command for increasing a manipulation amount of the first combustor is input to the controller, the controller causes the flow rate of the exhaust gas discharged from the first combustor and the ventilator to become constant by increasing the manipulation amount of the combustible gas supply unit configured to supply the combustible gas to the first combustor and decreasing the manipulation amount of the air supply unit configured to supply the air to the first combustor.

11. The power generation system according to claim 1, wherein:
the fuel cell unit includes:
a first combustible gas supply unit configured to supply the combustible gas to the first combustor, and
a first air supply unit configured to supply air to the first combustor;
the combustion unit includes:
a second combustible gas supply unit configured to supply the combustible gas to the second combustor, and
a second air supply unit configured to supply the air to the second combustor;
the controller prestores a first threshold that is an air-fuel ratio higher than one and equal to or lower than two; and
when the air-fuel ratio of the first combustor is lower than the first threshold, and the controller causes the second combustor to perform the ignition operation, and if a command for increasing a manipulation amount of the first combustor is input to the controller, the controller causes the second combustor to perform the ignition operation, and then increases a combustion amount of the first combustor.

12. The power generation system according to claim 1, wherein:
the fuel cell unit includes:
a first combustible gas supply unit configured to supply the combustible gas to the first combustor, and
a first air supply unit configured to supply air to the first combustor;
the combustion unit includes:
a second combustible gas supply unit configured to supply the combustible gas to the second combustor, and
a second air supply unit configured to supply the air to the second combustor;

the controller prestores a second threshold that is an air-fuel ratio within a range that combustion in the first combustor is continued and which is an air-fuel ratio higher than two; and when the air-fuel ratio of the first combustor is higher than one and equal to or lower than the second threshold, and the controller causes the second combustor to perform the ignition operation, and if a command for decreasing a combustion amount of the first combustor is input to the controller, the controller causes the air-fuel ratio of the first combustor to become higher than one and equal to or lower than the second threshold by decreasing a manipulation amount of the combustible gas supply unit configured to supply the combustible gas to the first combustor and increasing the manipulation amount of the air supply unit configured to supply the air to the first combustor.

13. The power generation system according claim 1, wherein:

the fuel cell unit includes:
a first combustible gas supply unit configured to supply the combustible gas to the first combustor, and
a first air supply unit configured to supply air to the first combustor;

the combustion unit includes:
a second combustible gas supply unit configured to supply the combustible gas to the second combustor, and
a second air supply unit configured to supply the air to the second combustor;

the controller prestores a second threshold that is an air-fuel ratio within a range that combustion in the first combustor is continued and which is an air-fuel ratio higher than two; and when the air-fuel ratio of the first combustor is higher than the second threshold, and the controller causes the second combustor to perform the ignition operation, and if a command for decreasing a manipulation amount of the first combustor is input to the controller, the controller causes the second combustor to perform the ignition operation, and then decreases a combustion amount of the first combustor.

14. The power generation system according to claim 9, wherein:

the combustion unit includes:
a second combustible gas supply unit configured to supply the combustible gas to the second combustor, and
a second air supply unit configured to supply air to the second combustor; and when the controller increases a combustion amount of the combustion unit during the period of the ignition operation of the first combustor, the controller increases a manipulation amount of the second combustible gas supply unit and decreases the manipulation amount of the second air supply unit; and when the controller decreases the combustion amount of the combustion unit during the period of the ignition operation of the first combustor, the controller decreases the manipulation amount of the second combustible gas supply unit and increases the manipulation amount of the second air supply unit.

15. A method of operating a power generation system, the power generation system comprising:

a fuel cell unit including:
a fuel cell configured to generate electric power using a fuel gas and an oxidizing gas,
a hydrogen generator including a first combustor and configured to generate the fuel gas supplied to the fuel cell, and
a case which houses at least the fuel cell and the hydrogen generator;

a combustion unit arranged outside the case and including a second combustor configured to combust a combustible gas, the combustion unit and the fuel cell unit are separate units;

a controller, wherein the controller individually controls the fuel cell unit and the combustion unit; and a discharge passage which is formed to cause the fuel cell unit and the combustion unit to communicate with each other and through which an exhaust gas discharged from the first combustor of the fuel cell unit and an exhaust gas discharged from the combustion unit are discharged to an atmosphere from a downstream end of the discharge passage which end is open to the atmosphere, the discharge passage including:

a first passage which includes an upstream end connected to the fuel cell unit and through which the exhaust gas discharged from the first combustor of the fuel cell unit flows, a second passage which includes an upstream end connected to the combustion unit and through which the exhaust gas discharged from the combustion unit flows, a merging portion where the first passage and the second passage merge, and a common passage which extends from the merging portion to the downstream end of the discharge passage, wherein the fuel cell unit includes a ventilator configured to operate when the fuel cell performs an electric power generating operation, and to ventilate an inside of the fuel cell unit by discharging a gas in the fuel cell unit to the discharge passage; and the discharge passage is configured such that at least a gas in the case is discharged to the atmosphere, the method comprising:

when causing the second combustor to perform an ignition operation, maintaining an operating state of the first combustor and an operating state of the ventilator during a period of the ignition operation of the second combustor.

* * * * *